US011241867B2

(12) United States Patent
Dodworth

(10) Patent No.: US 11,241,867 B2
(45) Date of Patent: Feb. 8, 2022

(54) MULTICOMPONENT POLYMER RESIN, METHODS FOR APPLYING THE SAME, AND COMPOSITE LAMINATE STRUCTURE INCLUDING THE SAME

(71) Applicant: BRIGHT LITE STRUCTURES LLC, San Francisco, CA (US)

(72) Inventor: Antony Dodworth, Stamford (GB)

(73) Assignee: BRIGHT LITE STRUCTURES LLC, San Francisco, CA (US)

( * ) Notice: Subject to any disclaimer, the term of this patent is extended or adjusted under 35 U.S.C. 154(b) by 0 days.

(21) Appl. No.: 16/537,051

(22) Filed: Aug. 9, 2019

(65) Prior Publication Data

US 2019/0358943 A1 Nov. 28, 2019

Related U.S. Application Data

(62) Division of application No. 15/311,271, filed as application No. PCT/US2015/034051 on Jun. 3, 2015, now Pat. No. 10,406,789.

(Continued)

(51) Int. Cl.
| | | |
|---|---|---|
| B32B 27/12 | (2006.01) | |
| B29D 24/00 | (2006.01) | |
| B32B 37/14 | (2006.01) | |
| B29C 44/12 | (2006.01) | |
| C08G 18/00 | (2006.01) | |
| B29C 70/02 | (2006.01) | |
| B29C 70/34 | (2006.01) | |
| B32B 3/12 | (2006.01) | |
| B32B 27/36 | (2006.01) | |
| B29C 43/20 | (2006.01) | |
| B29C 43/34 | (2006.01) | |
| B29C 43/56 | (2006.01) | |
| B32B 3/20 | (2006.01) | |
| B32B 5/02 | (2006.01) | |
| B32B 5/18 | (2006.01) | |
| B29B 7/88 | (2006.01) | |
| B29B 13/02 | (2006.01) | |
| B29C 70/30 | (2006.01) | |
| B32B 27/10 | (2006.01) | |
| B32B 27/20 | (2006.01) | |
| B32B 27/38 | (2006.01) | |
| B32B 27/40 | (2006.01) | |
| B32B 5/24 | (2006.01) | |
| B32B 27/06 | (2006.01) | |
| B29C 67/20 | (2006.01) | |
| B29K 105/04 | (2006.01) | |
| B32B 38/00 | (2006.01) | |
| B29K 69/00 | (2006.01) | |
| B29K 105/08 | (2006.01) | |
| B29L 31/30 | (2006.01) | |

(Continued)

(52) U.S. Cl.
CPC .............. *B32B 27/12* (2013.01); *B29B 7/88* (2013.01); *B29B 13/02* (2013.01); *B29C 43/203* (2013.01); *B29C 43/34* (2013.01); *B29C 43/56* (2013.01); *B29C 44/1209* (2013.01); *B29C 70/02* (2013.01); *B29C 70/305* (2013.01); *B29C 70/34* (2013.01); *B29C 70/345* (2013.01); *B29D 24/005* (2013.01); *B32B 3/12* (2013.01); *B32B 3/20* (2013.01); *B32B 5/02* (2013.01); *B32B 5/024* (2013.01); *B32B 5/18* (2013.01); *B32B 5/245* (2013.01); *B32B 27/065* (2013.01); *B32B 27/10* (2013.01); *B32B 27/20* (2013.01); *B32B 27/365* (2013.01); *B32B 27/38* (2013.01); *B32B 27/40* (2013.01); *B32B 37/146* (2013.01); *C08G 18/003* (2013.01); *B29C 44/1285* (2013.01); *B29C 67/205* (2013.01); *B29C 2043/561* (2013.01); *B29C 2043/568* (2013.01); *B29K 2023/06* (2013.01); *B29K 2063/00* (2013.01); *B29K 2069/00* (2013.01); *B29K 2075/00* (2013.01); *B29K 2105/04* (2013.01); *B29K 2105/041* (2013.01); *B29K 2105/0872* (2013.01); *B29K 2105/16* (2013.01); *B29K 2105/251* (2013.01); *B29K 2307/04* (2013.01); *B29K 2509/00* (2013.01); *B29L 2009/00* (2013.01); *B29L 2031/30* (2013.01); *B32B 2038/0024* (2013.01); *B32B 2305/022* (2013.01); *B32B 2305/076* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 2,882,673 | A | 4/1959 | Heinrich |
| 3,051,992 | A | 9/1962 | Bradley |

(Continued)

FOREIGN PATENT DOCUMENTS

| | | |
|---|---|---|
| CN | 201566184 U | 9/2010 |
| CN | 101946051 A | 1/2011 |

(Continued)

OTHER PUBLICATIONS

Advisory Action for U.S. Appl. No. 15/560,831 dated Apr. 6, 2020.

(Continued)

*Primary Examiner* — Ana L. Woodward
(74) *Attorney, Agent, or Firm* — Dorsey & Whitney LLP

(57) ABSTRACT

Embodiments disclosed herein relate to polymer resins having a first thermoset and one or more additional components (e.g., a second thermoset and/or a thermoplastic), composite laminates including the same, methods of making and using the same, and composite laminate structures including the same.

17 Claims, 11 Drawing Sheets

Related U.S. Application Data

(60) Provisional application No. 62/007,614, filed on Jun. 4, 2014, provisional application No. 62/007,632, filed on Jun. 4, 2014, provisional application No. 62/007,652, filed on Jun. 4, 2014, provisional application No. 62/007,670, filed on Jun. 4, 2014, provisional application No. 62/007,685, filed on Jun. 4, 2014, provisional application No. 62/108,837, filed on Jan. 28, 2015.

(51) Int. Cl.

| | |
|---|---|
| B29K 105/00 | (2006.01) |
| B29K 63/00 | (2006.01) |
| B29K 75/00 | (2006.01) |
| B29K 105/16 | (2006.01) |
| B29K 307/04 | (2006.01) |
| B29K 509/00 | (2006.01) |
| B29L 9/00 | (2006.01) |

(56) References Cited

U.S. PATENT DOCUMENTS

| | | |
|---|---|---|
| 3,303,733 A | 2/1967 | Sheffield et al. |
| 3,314,582 A | 4/1967 | Haigler |
| 3,484,398 A | 12/1969 | Childs |
| 3,906,137 A | 9/1975 | Bauer |
| 4,543,289 A | 9/1985 | Park |
| 4,687,691 A | 8/1987 | Kay et al. |
| 4,940,563 A | 7/1990 | Kromrey |
| 4,983,247 A | 1/1991 | Kim |
| 5,034,256 A | 7/1991 | Santiso, III et al. |
| 5,484,500 A | 1/1996 | Kaufmann et al. |
| 5,540,870 A | 7/1996 | Quigley |
| 5,645,926 A | 7/1997 | Horrocks et al. |
| 5,683,782 A | 11/1997 | Duchene et al. |
| 5,716,697 A | 2/1998 | Meeker |
| 5,756,182 A | 5/1998 | Landi et al. |
| 5,819,514 A | 10/1998 | Firdaus |
| 5,979,531 A | 11/1999 | Barr et al. |
| 6,038,949 A | 3/2000 | Jander |
| 6,139,942 A | 10/2000 | Hartness et al. |
| 6,197,146 B1 | 3/2001 | Sucic et al. |
| 6,251,185 B1 | 6/2001 | Morrison et al. |
| 8,028,736 B2 | 10/2011 | Jander |
| 8,334,055 B2 | 12/2012 | Le Gall et al. |
| 8,556,358 B2 | 10/2013 | Fitzgerald et al. |
| RE44,893 E | 5/2014 | Raghavendran et al. |
| 8,777,136 B2 | 7/2014 | Jander |
| 2002/0010973 A1 | 1/2002 | Dumlao et al. |
| 2002/0045696 A1 | 4/2002 | Sullivan et al. |
| 2002/0106503 A1 | 8/2002 | Monk et al. |
| 2002/0176979 A1 | 11/2002 | Evans |
| 2003/0098520 A1 | 5/2003 | Cournoyer et al. |
| 2003/0130411 A1 | 7/2003 | Ishikawa et al. |
| 2003/0175455 A1 | 7/2003 | Erb et al. |
| 2004/0028877 A1 | 2/2004 | Itoh et al. |
| 2006/0048311 A1 | 3/2006 | Lee |
| 2006/0065152 A1 | 3/2006 | Heitmeyer et al. |
| 2006/0251902 A1 | 11/2006 | Botrie et al. |
| 2007/0125042 A1 | 6/2007 | Hughes et al. |
| 2007/0256379 A1 | 11/2007 | Edwards |
| 2008/0223857 A1 | 9/2008 | Palley et al. |
| 2009/0227162 A1 | 9/2009 | Kruckenberg et al. |
| 2010/0021718 A1 | 1/2010 | Vos et al. |
| 2010/0255283 A1 | 10/2010 | Monk et al. |
| 2010/0261000 A1 | 10/2010 | Jones |
| 2011/0089183 A1 | 4/2011 | Gundelsheimer |
| 2011/0143087 A1 | 6/2011 | Alberding et al. |
| 2011/0180959 A1 | 7/2011 | Donnelly et al. |
| 2011/0272509 A1 | 11/2011 | Jander |
| 2012/0098300 A1 | 4/2012 | Murray |
| 2012/0141765 A1 | 6/2012 | Katahira et al. |
| 2012/0177874 A1 | 7/2012 | Brandon et al. |
| 2012/0204741 A1 | 8/2012 | Bremmer et al. |
| 2013/0101822 A1 | 4/2013 | Kunal et al. |
| 2013/0171381 A1 | 7/2013 | Grove-Nielsen |
| 2013/0203878 A1 | 8/2013 | Igualada et al. |
| 2013/0224410 A1 | 8/2013 | Nozawa |
| 2013/0273308 A1 | 10/2013 | Day et al. |
| 2013/0284003 A1 | 10/2013 | Dodworth |
| 2013/0292076 A1 | 11/2013 | Raghavendran et al. |
| 2013/0323429 A1 | 12/2013 | Strobel et al. |
| 2014/0011016 A1 | 1/2014 | Vanimisetti et al. |
| 2014/0145470 A1 | 5/2014 | Preisler et al. |
| 2015/0166743 A1 | 6/2015 | Restuccia et al. |
| 2017/0057823 A1 | 3/2017 | Hart et al. |
| 2017/0095997 A1 | 4/2017 | Dodworth |
| 2017/0218141 A1 | 8/2017 | Nosker et al. |
| 2017/0283571 A1 | 10/2017 | Taketa et al. |

FOREIGN PATENT DOCUMENTS

| | | |
|---|---|---|
| CN | 201755923 U | 3/2011 |
| CN | 102227521 A | 10/2011 |
| CN | 102271888 A | 12/2011 |
| CN | 102548741 A | 7/2012 |
| CN | 203077713 U | 7/2013 |
| CN | 104254439 A | 12/2014 |
| DE | 102013225730 A1 | 6/2015 |
| EP | 0352993 A1 | 1/1990 |
| EP | 0478033 A1 | 4/1992 |
| EP | 0605235 A2 | 7/1994 |
| EP | 0628406 A2 | 12/1994 |
| EP | 0794051 A1 | 9/1997 |
| EP | 0798107 A2 | 10/1997 |
| EP | 1789250 B1 | 5/2016 |
| FR | 2890893 A1 | 3/2007 |
| GB | 2101930 A | 1/1983 |
| GB | 2300380 A | 11/1996 |
| JP | Y1965027900 | 9/1965 |
| JP | 51041764 A | 4/1976 |
| JP | S5334866 Y2 | 8/1978 |
| JP | S55-049251 A | 4/1980 |
| JP | S57113695 U | 7/1982 |
| JP | 01320145 A | 12/1989 |
| JP | 02088227 A | 3/1990 |
| JP | H0288227 A | 3/1990 |
| JP | H03-099812 A | 4/1991 |
| JP | H03109145 A | 5/1991 |
| JP | H05132540 A | 5/1993 |
| JP | H06270304 A | 9/1994 |
| JP | 06344477 A | 12/1994 |
| JP | 07047626 A | 2/1995 |
| JP | H0718081 U | 3/1995 |
| JP | 07125118 A | 5/1995 |
| JP | H07180281 A | 7/1995 |
| JP | H07256803 A | 10/1995 |
| JP | 08258189 A | 10/1996 |
| JP | H08258189 A | 10/1996 |
| JP | 1125453 A | 1/1999 |
| JP | H11-25453 | 1/1999 |
| JP | 11207843 A | 8/1999 |
| JP | H11-207843 A | 8/1999 |
| JP | H11207843 A | 8/1999 |
| JP | 11247356 A | 9/1999 |
| JP | H11254563 A | 9/1999 |
| JP | 2000006145 A | 1/2000 |
| JP | 2000043171 A | 2/2000 |
| JP | 2001031838 A | 2/2001 |
| JP | 2003025360 A | 1/2003 |
| JP | 2004017355 A | 1/2004 |
| JP | 2006186688 A | 7/2006 |
| JP | 2007331369 A | 12/2007 |
| JP | 2008230235 A | 10/2008 |
| JP | 2008238566 A | 10/2008 |
| JP | 2010149260 A | 7/2010 |
| JP | 2013001006 A | 1/2013 |
| JP | 2013032510 A | 2/2013 |
| JP | 2014533751 A | 12/2014 |
| WO | 90/00968 | 2/1990 |
| WO | 92/10362 | 6/1992 |
| WO | 92/12855 A | 8/1992 |

(56) References Cited

FOREIGN PATENT DOCUMENTS

| WO | 2003101719 A2 | 12/2003 |
|---|---|---|
| WO | 2009011304 A1 | 1/2009 |
| WO | 2009157295 A1 | 12/2009 |
| WO | 2013178755 A1 | 12/2013 |
| WO | 2014130751 A1 | 8/2014 |
| WO | 2015187873 A1 | 12/2015 |
| WO | 2015187879 A1 | 12/2015 |
| WO | 2016028359 A2 | 2/2016 |
| WO | 2016178755 A1 | 11/2016 |
| WO | 2017120025 A1 | 7/2017 |

OTHER PUBLICATIONS

Corrected Notice of Allowability for U.S. Appl. No. 15/311,606 dated Aug. 17, 2020.
Corrected Notice of Allowability for U.S. Appl. No. 15/311,703 dated Aug. 19, 2020.
Corrected Notice of Allowability for U.S. Appl. No. 15/311,703 dated Aug. 31, 2020.
International Search Report and Written Opinion from International Application No. PCT/US2019/062138 dated Mar. 19, 2020.
International Search Report and Written Opinion from International Application No. PCT/US2019/062139 dated Mar. 19, 2020.
Issue Notification for U.S. Appl. No. 15/311,606 dated Sep. 3, 2020.
Issue Notification for U.S. Appl. No. 15/311,703 dated Sep. 9, 2020.
Non-Final Office Action for U.S. Appl. No. 15/560,831 dated May 29, 2020.
Notice of Allowance for U.S. Appl. No. 15/311,606 dated May 11, 2020.
Notice of Allowance for U.S. Appl. No. 15/311,703 dated May 11, 2020.
Notice of Allowance for U.S. Appl. No. 15/560,831 dated Sep. 4, 2020.
U.S. Appl. No. 62/769,446, filed Nov. 19, 2018.
Final Office Action for U.S. Appl. No. 15/560,831 dated Feb. 4, 2020.
Issue Notification for U.S. Appl. No. 15/311,271 dated Aug. 21, 2019.
Issue Notification for U.S. Appl. No. 15/311,344 dated Aug. 14, 2019.
Non-Final Office Action for U.S. Appl. No. 15/560,831 dated Aug. 29, 2019.
Notice of Allowance for U.S. Appl. No. 15/311,344 dated Apr. 25, 2019.
Notice of Allowance for U.S. Appl. No. 15/311,606 dated Jan. 29, 2020.
Notice of Allowance for U.S. Appl. No. 15/311,606 dated Sep. 30, 2019.
Notice of Allowance for U.S. Appl. No. 15/311,703 dated Feb. 5, 2020.
Notice of Allowance for U.S. Appl. No. 15/311,703 dated Oct. 23, 2019.
"Araldite FST 40002/40003 FST Composite System for Aerospace Interior," Huntsman Advanced Materials Flyer, 2014, pp. 1-2.
"Araldite FST 40004/40005 FST Composite System for Railway," Huntsman Advanced Materials Flyer, 2016, pp. 1-2.
"Araldite, Solutions or Automotive Mass Production," Huntsman Advanced Materials Flyer, 2014, pp. 1-2.
"Tough Sandwich Design Lightens Load Floor in Crossover SUV," Composites Technology, Jun. 1, 2008, Retrieved Nov. 22, 2016.
Bosch, Marcos Ramos, "New Sandwich Composites: For Lightweight Construction in the Automotive Industry," JEC Magazine #45, Nov.-Dec. 2008, Retrieved Nov. 22, 2016.
CompositesWorld, "High-tensile strength, high-modulus carbon fiber" Mar. 10, 2014 [online] [retrieved on Oct. 1, 2015). Retrieved from the Internet <URL: http://www.compositesworld.com/products/high-tensile-strength-high-modulus-carbon-fiber>.
International Search Report and Written Opinion from International Application No. PCT/US2015/034051 dated Nov. 3, 2015.
International Search Report and Written Opinion from International Application No. PCT/US2015/034061 dated Aug. 19, 2015.
International Search Report and Written Opinion from International Application No. PCT/US2015/034070 dated Feb. 1, 2016.
International Search Report and Written Opinion from International Application No. PCT/US2015/034072 dated Nov. 2, 2015.
Non-Final Office Action for U.S. Appl. No. 15/311,271 dated Nov. 19, 2018.
Non-Final Office Action for U.S. Appl. No. 15/311,344 dated Jan. 11, 2018.
Non-Final Office Action for U.S. Appl. No. 15/311,606 dated May 9, 2019.
Non-Final Office Action for U.S. Appl. No. 15/311,703 dated Jun. 17, 2019.
Non-Final Office Action for U.S. Appl. No. 15/311,703 dated Sep. 18, 2018.
Notice of Allowance for U.S. Appl. No. 15/311,271 dated May 1, 2019.
Notice of Allowance for U.S. Appl. No. 15/311,344 dated Jan. 15, 2019.
Notice of Allowance for U.S. Appl. No. 15/311,344 dated Jun. 20, 2018.
Notice of Allowance for U.S. Appl. No. 15/311,344 dated Sep. 28, 2018.
Notice of Allowance for U.S. Appl. No. 15/311,606 dated Jan. 23, 2019.
Notice of Allowance for U.S. Appl. No. 15/311,703 dated Mar. 5, 2019.
Restriction Requirement for U.S. Appl. No. 15/311,271 dated Aug. 28, 2018.
Restriction Requirement for U.S. Appl. No. 15/311,344 dated Oct. 20, 2017.
Restriction Requirement for U.S. Appl. No. 15/311,606 dated Jun. 7, 2018.
Restriction Requirement for U.S. Appl. No. 15/311,703 dated Jun. 27, 2018.
Restriction Requirement for U.S. Appl. No. 15/560,831 dated Apr. 2, 2019.
International Search Report and Written Opinion from International Application No. PCT/US2016/025270 dated Jun. 24, 2016.
Issue Notification for U.S. Appl. No. 15/560,831 dated Mar. 17, 2021.
Notice of Allowance for U.S. Appl. No. 15/560,831 dated Dec. 9, 2020.
U.S. Appl. No. 62/007,614, filed Jun. 4, 2014.
U.S. Appl. No. 62/007,632, filed Jun. 4, 2014.
U.S. Appl. No. 62/007,652, filed Jun. 4, 2014.
U.S. Appl. No. 62/007,670, filed Jun. 4, 2014.
U.S. Appl. No. 62/007,685, filed Jun. 4, 2014.
U.S. Appl. No. 62/108,837, filed Jan. 28, 2015.
U.S. Appl. No. 62/142,722, filed Apr. 3, 2015.
Zhan, et al., "Influences of film forming materials on the performance of graphene fire resistive coating", Fullerenes, Nanotubes and Carbon Nanostructures, ISSN: (Print) (Online) Journal homepage: https://www.tandfonline.com/loi/lfnn20, Sep. 11, 2020, pp. 126-136.

MULTICOMPONENT POLYMER RESIN, METHODS FOR APPLYING THE SAME, AND COMPOSITE LAMINATE STRUCTURE INCLUDING THE SAME

CROSS-REFERENCE TO RELATED PATENT APPLICATIONS

This application is a divisional application of U.S. application Ser. No. 15/311,271 filed on 2 Apr. 2019, which claims priority to International Patent Application No. PCT/US2015/34051 filed on 15 Nov. 2016, which claims priority to U.S. Provisional Application No. 62/007,614 filed on 4 Jun. 2014, U.S. Provisional Application No. 62/007,632 filed on 4 Jun. 2014, U.S. Provisional Application No. 62/007,652 filed on 4 Jun. 2014, U.S. Provisional Application No. 62/007,670 filed on 4 Jun. 2014, U.S. Provisional Application No. 62/007,685 filed on 4 Jun. 2014, and U.S. Provisional Application No. 62/108,837 filed on 28 Jan. 2015, the disclosure of each of which is incorporated herein, in its entirety, by this reference.

BACKGROUND

High volume production for structural parts focuses on low cost materials and low assembly costs, but may initially require a long-term investment of high capital for tooling and equipment. However, the high volume production may not adapt to design variations easily.

Presently, low volume production for parts involves low capital expenditures, expensive materials and high assembly costs, for example, aluminum components. Overall, low volume production is still very expensive.

It is desirable to produce light weight, strong, and stiff composites for fabricating a structure component, such as a chassis, panels for communication equipment, frames or body parts for transportation or vehicles (e.g., bicycles, motor cycles, trucks etc.), agricultural applications (e.g., agricultural equipment), energy related applications (e.g., wind power, solar), satellite applications, aerospace applications, construction materials (e.g., building materials and the like), and consumer products (e.g., furniture, toilet seats, and electronic products among others).

It is desirable to produce light weight, strong composite components with good energy absorption for fabricating a chassis or a body component, such as a car hood or other body panel. The body components may be designed to provide energy absorption during a car accident. For safety reasons, the car hood or the body components may be designed to have some damping or energy absorption characteristics.

Composite components for the transportation (e.g., auto, truck, or any vehicle), agricultural equipment, construction equipment, or aerospace industries may significantly improve fuel efficiency and reduce carbon emissions. The composite may include carbon fibers or glass fibers. The carbon fibers may be stiffer, stronger, and less heavy than the glass fibers, but generally may be more expensive. Carbon fiber reinforced components may be about 20% lighter than aluminum components and about 50% lighter than some steel components. Carbon fiber reinforced composites may have a higher ratio of strength-to-weight or stiffness-to-weight than aluminum and steel.

Currently, composite components are often fabricated by conventional processes, including a high pressure resin transfer molding (RTM). Composite components may also be formed of pre-impregnated fibers ("prepreg") and may require an oven or autoclave to cure the prepreg. Traditionally, carbon fiber reinforced composite components are not cost competitive compared to metal components for several reasons. First, the high pressure RTM may require relatively expensive equipment, and high pressure to flow a polymer resin to impregnate the fibers and to reduce surface defects (e.g., pin holes or undesired porosity). Notwithstanding high pressure application of the resin, the surface may still have pin holes or surface defects. A surface with such defects may not exhibit the desired surface finish or be cosmetically desirable. Such surface defects may also make painting the composite surface more difficult. Second, the high pressure RTM may also require longer cycle times to fabricate a composite component compared to metal components. For example, production cycle times for carbon fiber parts; including heating, curing, and cooling the composite component, may take about 45 minutes or longer as compared to seconds for steel or aluminum parts. Third, the material cost may be high for the virgin carbon fibers, and the fiber waste from the RTM may also be very high. For example, up to 40% of the original carbon fibers, when a composite component with complicated shape or geometry is fabricated may be wasted. Also, the production yield for RTM parts is relatively low compared to metal parts due to surface defects.

Manufacturers continue to seek low cost alternative materials, low cost tooling, and faster cycle times to reduce the production cost for composite components.

SUMMARY

Embodiments disclosed herein relate to a polymer resin with low viscosity. More specifically, embodiments relate to polymer resin composition and properties, apparatus and methods for applying the polymer resin to form fiber-reinforced composite sandwich structures and fiber reinforced composite structures.

In an embodiment, a method of forming a composite laminate structure is disclosed. The method includes mixing a polymer resin including a polyurethane and an epoxy. The method includes heating to and maintaining the polymer resin at an application temperature between an ambient temperature and a curing temperature of a component of the polymer resin. The method includes applying the polymer resin onto a fiber sheet. The method includes positioning the fiber sheet on a core including a plurality of cells at least partially defined by corresponding cell walls, with the fiber sheet extending across at least some of the plurality of cells. The fiber sheet includes the applied polymer resin thereon. The method further includes, after positioning, curing the polymer resin applied on the fiber sheet.

In an embodiment, a composite laminate structure is disclosed. The composite laminate structure includes at least one core including a plurality of cells at least partially defined by corresponding cell walls. The composite laminate structure includes one or more first composite laminates attached to a first end of the core and one or more second composite laminates attached to a second end of the core. Each of the one or more first and the one or more second composite laminates having a cured polymer resin therein. The cured polymer resin includes a polyurethane and an epoxy.

In an embodiment, a polymer resin is disclosed. The polymer resin includes a mixture including a first thermoset and at least a second thermoset. The second thermoset has a greater hardness and water resistance than the first thermoset upon curing and the second thermoset being about 50% or less of the polymer resin by volume. The first thermoset epoxy and the second thermoset are each present in an amount sufficient to allow formation of micro-foams after being mixed.

In an embodiment, a method of applying a polymer resin is disclosed. The method includes placing a polymer resin in a container, the polymer resin including a polyurethane and an epoxy. The method includes mixing the polymer resin with a hardener in the container at an ambient temperature, wherein the hardener is composed to cure the polymer resin at a first temperature. The method includes placing the container in a pressure container containing a fluid. The method further includes heating to and maintaining the polymer resin at an application temperature between the first temperature and the ambient temperature sufficient to cause the polymer resin to exhibit a viscosity of about 300 centipoise or less, and the fluid is maintained at the application temperature. The method further includes applying the polymer resin onto a fiber sheet.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1A:
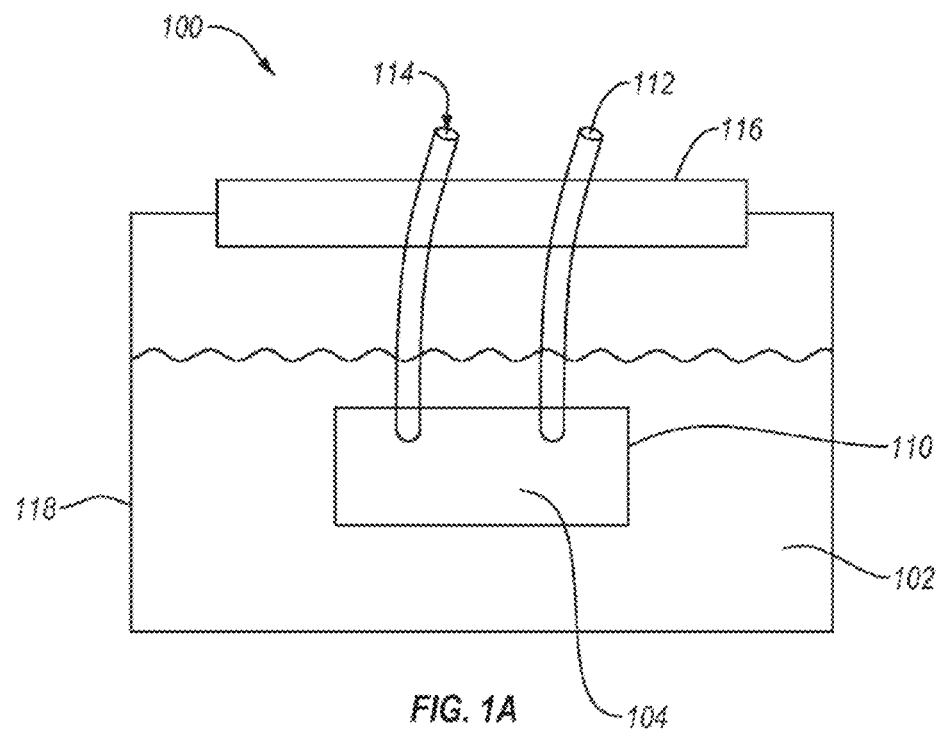
FIG. 1A is a diagram of a pressure pot for heating and spraying a polymer resin according to an embodiment.

Embodiments disclosed herein relate to polymer resins having a first thermoset and one or more additional components (e.g., a second thermoset and/or a thermoplastic), composite laminates including the same, methods of making and using the same, and composite laminate structures including the same. Embodiments disclosed herein provide a polymer resin including a liquid blend or mixture of a first thermoset (e.g., a polyurethane) and at least a second thermoset (e.g., an epoxy) and/or other polymer material such as one or more thermoplastics. The polymer resins are usually in a liquid form prior to curing and become solid after curing, which is a cross-linking process. The polymer resin may include one or more hardeners therein to catalyze curing of one or more components of the resin. The polymer resins may be used as adhesives. Two or more thermosets may be used to form a composite laminate structure, such as a carbon fiber composite laminate. Composite laminates may include one or more layers of polymer resin on, or at least partially incorporated into, a fiber sheet or mat.

The polymer resin has a low viscosity at elevated temperatures such that the polymer resin can be sprayed at a low pressure, such as less than 90 psi. The polymer resin may also form micro-foams during curing. The micro-foams may attach to relatively stiffer materials (e.g., plastics) well, especially when the materials have a small surface area for bonding, for example, open ends of cells such as tubes (e.g., plastic tubes) as discussed in more detail below.

As discussed in greater detail below, the polymer resin can be used to form composite sandwiches including a "hard" core or a "soft" core. The "hard" core may effectively transfer the load from one end of the core to the other end of the core. For example, the "hard" core may be formed from a core blank that includes one or more plastic materials and may include a plurality of cells having open ends (e.g., closely-packed substantially parallel plastic tubes). The plurality of cells may be at least partially defined by corresponding one or more cell walls (e.g., the plastic material may define a honeycomb-like structure, where the cells may have any number of suitable shapes). In some embodiments, the compressible cells of the core blank may be formed or defined by tubes or straws. In some embodiments, the cells may be tubes, such as drinking straws (e.g., each straw may define a corresponding cell of the core and adjacent cores may define additional cells in the gaps or spaces therebetween). Plastic straws are commercially made of polycarbonate at very low cost may be secured together in a generally parallel arrangement. The hard core may alternatively or additionally include a high density foam. The hard core can provide a high bending stiffness for the composite sandwich. In the case of the cells, more specifically plastic tubes, the core may have a plurality of cells or tubes, each having open ends. The "hard" core may increase the bending stiffness of the composite sandwich more than the "soft" core.

More detail about suitable cores that may be used in any of the embodiments disclosed herein can be found in PCT International Application No. PCT/US2015/034070 entitled "Composite sandwich with high bending stiffness and light weight" and filed Jun. 3, 2015 (which claims priority to U.S. Provisional Patent Application No. 62/007,614 entitled "Composite sandwich with high bending stiffness and light weight," filed on Jun. 4, 2014), which is incorporated herein by this reference in its entirety. The core of the composite sandwich may include a bundle of plastic tubes, such as drinking straws, and may be suitable for fabricating auto components, such as a chassis.

The "hard" core, such as that formed of open ended plastic cells, such as tubes or drinking straws, may be difficult to attach to the composite laminate (e.g., one or more layers of composite laminate forming a single layer over the core) using a conventional epoxy. For example, the composite laminate may be more likely to peel off the "hard" core when a conventional epoxy is used. The polymer resins according to embodiments disclosed herein resolve the peeling problem for the composite sandwich that includes a "hard" core by providing sufficient adhesion thereto (e.g., by greater adhesion with micro-foams formed by the polymer/epoxy blend which may at least partially extend into the cells via the open ends).

In contrast, a "soft" core may not transfer the load from one end of the core to the opposite end of the core when a load is applied onto one end of the core, for example, the "soft" core may be formed from paperboards, or cardboards, or low density foams, and the like. The "soft" core may absorb more energy or impact vertically than the "hard" core (e.g., in a direction substantially perpendicular to the composite laminates) assuming the impact is along a Z axis (e.g., generally perpendicular to the face of the composite laminate). The "hard" core may absorb more energy horizontally, such as along the plane of the composite laminates (e.g., in an X-Y plane) which is perpendicular to the Z axis. The composite sandwich, including paperboards, may be used for car hoods, automotive surface panels (e.g., A-class surface panels having minimal pinholes or porosity therein), aerospace applications, or consumer products (e.g., furniture), or construction materials or similar applications where energy absorption is desired. The manufacturing process may be different for the "soft" core composite sandwich from the "hard" core composite sandwich, because the "soft" core does not transfer a load having a vector substantially perpendicular to the core as well as the "hard" core does. Details on apparatus and methods for fabricating composite sandwich with a "soft" core are disclosed in PCT International Application No. PCT/US2015/034072, entitled "Composite Structure Exhibiting Energy Absorption and/or Including a Defect Free Surface," and filed Jun. 3, 2015 which is incorporated herein by this reference in its entirety.

Resin Composition

According to one or more embodiments, the polymer resin may include a mixture of one or more thermosets having a relatively low viscosity and one or more thermosets and/or one or more thermoplastics having a relatively high viscosity, such as the mixture including a polyurethane with an epoxy. The mixture may have a relatively low viscosity (e.g., about 40 mPa·s or less) at room temperature. In some embodiments, explained in more detail below, the polymer resin may include one or more of at least one hardener, at least one Group VIII metal material, at least one filler material, or at least one thermoplastic. The low viscosity of the polymer resin may be mainly contributed by the low viscosity thermoset (e.g., a polyurethane, such as VITROX provided by Huntsman Polyurethanes having about 150 centipoise viscosity at room temperature), because the other high viscosity thermoset (e.g., epoxy EP05475 provided by Momentive) generally has a relatively higher viscosity than the low viscosity thermoset. The viscosity of the polyurethane may be about 30-40 mPa·s, and the viscosity of the epoxy may be about 50-70 mPa·s (or in a special case about 15 mPa·s (for VoraForce 5300 by Dow)). The polymer resins disclosed herein may have relatively short cure times while exhibiting relatively little shrinkage (e.g., below about 3%). The epoxy EP05475 has a curing time of 5 minutes at 120° C., and a $T_g$ of about 120° C., whereas the curing time of the polyurethane may be about 1 hour or more and a $T_g$ below about 250° C. As used herein, the term "cure" or "cured" includes the meanings at least partially or fully cure or cured.

A polyurethane thermoset may provide one or more of a desired resistance to bending, resiliency, low viscosity, or a foaming capability (e.g., ability to form micro-foams during formation of composite laminate structures) to the polymer resin. An epoxy thermoset may provide a desired energy absorption or mechanical failure profile to the polymer resin, such as brittle breakage along a force vector parallel to the surface of the part. The epoxy thermoset may provide a water resistant (e.g., water tight) character to the resulting composite laminate or a better load transfer capability (e.g., a harder surface).

In some embodiments, the polymer resin may include at least one curing agent or hardener, the hardener may be configured to cause one or more components of the polymer resin to cure. For example, when the polymer resin includes epoxy and polyurethane, the polymer resin may include a hardener for one or both of the epoxy or the polyurethane. Suitable hardeners for epoxies and polyurethanes may include any of those known to cure the epoxies and polyurethanes disclosed herein. For example, the at least one hardener may include amine-based hardeners for epoxies and polyisocyanate containing hardeners for polyurethanes. The curing agent or hardener may be present in the polymer resin in a ratio of about 1:100 to about 1:3 parts curing agent or hardener per part polymer resin or component thereof. In some embodiments, the hardener may be composed to start curing at about 50° C. or more, such as about 50° C. to about 150° C., about 70° C. to about 120° C., or about 70° C. to about 90° C., or about 70° C. or more.

In some embodiments, the polymer resin may also include a blend of one or more thermosets and a thermoplastic, such as a mixture of epoxy and thermoplastic fibers, or a mixture of polyurethane and thermoplastic fibers, or a combination of the foregoing. The thermoplastic may be included to provide a toughness or resiliency to the cured composite part. Suitable thermoplastics may include one or more of a polypropylene, a polycarbonate, polyethylene, polyphenylene sulfide, polyether ether ketone (PEEK) or another polyaryletherketone, or an acrylic. The thermoplastic may represent about 1% to about 20% of the polymer resin by volume. The polymer resin may also include a thermoset with a low viscosity, such as polyurethane. The polymer resin may also include a thermoset with a relative high viscosity, such as epoxy, which may be warmed up to reduce viscosity for spraying by using a pressure pot or commercial spray heads.

The polymer resin may have a better load transfer capability and improved mechanical performance, including higher stiffness, strength, modulus and hardness among others than resins having only polyurethane or only epoxy. The polymer resin may also have a low shrinkage by volume from the uncured liquid state to the cured solid state of equal to or less than 3% during curing, such as about 1.5% to about 3%, about 2% to about 3%, about 2.5% to about 3%, or about 2.5%. The low shrinkage allows better dimensional control of finished composite components.

Epoxy generally has a shorter shelf life than polyurethane. In some embodiments, the epoxy may be mixed just a few hours before use. In contrast, polyurethane generally has a longer shelf life than epoxy, is based on isocyanate chemistry, and may have an adjustable shelf life and snap cure capabilities. In some embodiments, the polyurethane or the epoxy may include one or more fire retardant components. For example, the polymer resin may include a phenolic epoxy or equivalents thereof.

The polymer resin, such as the mixture of polyurethane and epoxy, may be water resistant after curing due to the properties of one or more of the materials therein. Generally, a thermoset (e.g., polyurethane micro-foams) may have water permeation, while another thermoset (e.g., epoxy) may be water resistant. Therefore, the mixture may be water resistant or sealed from water when the water resistant thermoset is used in sufficient quantity. For example, when the amount of epoxy in a polyurethane/epoxy polymer resin is over about 28% by volume (e.g., 30% by volume), the mixture may exhibit substantially water resistant character.

Furthermore, the polymer resin may enable formation of polyurethane foams, which may enhance the bonding of the composite laminates to the core of the composite sandwich. It was found that the composite laminates formed according the instant disclosure do not peel off from the "hard" core, such as plastic tubes. In some embodiments herein, a selected amount of foaming may be desired in the polymer resin such as by one or more components therein (e.g., the polyurethane reacting to form a micro-foam). As the polyurethane in the polymer resin foams, the foam (e.g., micro-foam) may infiltrate into the cells or tubes of the core thereby forming a mechanical bond with the core. Such infiltration may take place at the open ends of the core and may include at least partial infiltration from the open ends inward.

In some embodiments, the polymer resin may include a liquid blend or mixture of epoxy and polyurethane. In some embodiments, the polymer resin may include at most about 50% by volume of epoxy including a curing agent or hardener, up to about 20% by volume of a Group VIII metal material and the remaining volume may be polyurethane. When mixed, the epoxy may react (e.g., thermally and/or chemically) with the polyurethane. When the amount of epoxy exceeds a certain amount (e.g., about 40% by volume), an undesired reaction may occur, which may cause undesired heat and/or uncontrolled foaming. In some embodiments, the polymer resin may include less than about 50% by volume of epoxy, such as about 40% by volume of epoxy, about 5% to about 40%, about 10% to about 35%, about 20% to about 30%, about 20% to about 40%, about 25% to about 35%, about 28% to about 32%, about 20%, about 25%, about 35%, or about 30% volume of the polymer resin. In some embodiments, the polymer resin may include less than about 30% by volume of epoxy. In some embodiments, the polymer resin may include less than about 20% by volume of epoxy. In some embodiments, the polymer resin may include less than about 10% by volume of epoxy. In some embodiments, the ratio of the polyurethane to the epoxy of the polymer resin may be about 1:1 or more, such as about 2:1, about 2.5:1, about 3:1, about 3.5:1, about 4:1, about 5:1, about 7:1, or about 9:1.

In an embodiment, the polymer resin may include polyurethane, epoxy, and at least one hardener. The at least one hardener may be composed to cause one or more components of the polymer resin to begin to cure. The at least one hardener may be specifically composed to cause only one component of the polymer resin to cure. Suitable hardeners may include amine-based hardeners for epoxies, polyisocyanate containing hardeners for polyurethanes, or any other hardener suitable to cause one or more components of the polymer resins disclosed herein to cure. In an embodiment, the epoxy may be about 10% to about 35% of the polymer resin by volume, the at least one hardener may be present in a ratio of about 1:100 to about 1:3 of the polymer resin or component thereof (e.g., a 1:5 ratio of hardener to epoxy or hardener to resin) by volume, and the polyurethane may make up at least some of the balance of the polymer resin. In an embodiment, the epoxy may be about 25% to about 35% of the polymer resin by volume, the at least one hardener may be present in a ratio of about 1:10 to about 1:3 or about 1:5 to about 1:3 of the polymer resin or component thereof (e.g., epoxy or polyurethane) by volume, and the polyurethane may make up at least some of the balance of the polymer resin. The at least one hardener may be composed or used in an amount sufficient to cause the polymer resin to cure (e.g., at least partially harden) in a desired time, such as about 3 hours or less, about 2 hours or less, about 1 hour or less, about 30 minutes or less, about 20 minutes or less, about 15 minutes or less, or about 10 minutes or less, depending on required time to apply the polymer resin.

The volume percentage or ratio of epoxy sufficient to cause an undesired or uncontrolled reaction (e.g., uncontrolled foaming) between the epoxy and polyurethane may vary with the addition of a Group VIII metal material. Group VIII metal materials may serve to stabilize or mediate the reaction of the epoxy and polyurethane in the polymer resin. The Group VIII metal material may include cobalt (Co), nickel (Ni), iron (Fe), ceramics (e.g., ferrites) including one or more of the same, or alloys including any of the same, among others. The Group VIII metal material may be equal to or less than 20% by volume of the polymer resin, such as about 0.1% to about 20%, about 0.5% to about 10%, about 1% to about 5%, about 2%, about 3%, or about 4% or less of the volume of the polymer resin. In some embodiments, the Group VIII metal material may be less than about 15% by volume of the polymer resin, less than about 10% by volume, less than about 5% by volume, or less than about 1% by volume of the polymer resin. By adding the Group VIII metal material to the polymer resin, the amount of epoxy therein may be increased to provide the surface hardness as desired and/or to create a substantially watertight surface. For example, as the volume percentage of epoxy in the polymer resin increases above about 25%, the cured composite may begin to exhibit watertight properties. If watertight properties are desired in the final product, the polymer resin may include about 28% epoxy by volume or more, such as about 30% or more, about 30% to about 50%, about 32% to about 40%, or about 35% epoxy by volume. In order to reduce or substantially eliminate pin holes or micro-pores in the resulting composite material as the amount of epoxy in the polymer resin increases, the Group VIII metal material may be added to reduce or control foaming Although the Group VIII metal material may help stabilize the polymer resin, the Group VIII metal material may add to the cost of the polymer resin and composite component or increase the viscosity of the polymer resin.

In some embodiments, one or more fillers may be added to the polymer resin mixture to reduce shrinkage during curing. For example, if a very fast curing epoxy is selected, such as Dow Voraforce 5300, the fast curing epoxy may exhibit a higher shrinkage than slower curing epoxies, such as about 7% by volume for the Voraforce 5300. In some embodiments, utilizing one or more fillers in the polymer resin may reduce such shrinkage in the same resin. Such fillers may include one or more of calcium carbonate, aluminum trihydroxide, alumina powders, silica powders, silicates, metal powders, or any relatively inert or insoluble (in the polymer resin) salt. An excess of filler material may cause the cured composite to exhibit undesirable brittleness. In some embodiments, the filler may be about 30% of the volume of the polymer resin or less, such as about 1% to about 30%, about 2% to about 20%, about 5% to about 15%, about 10% to about 30%, about 1% to about 10%, more than zero percent to about 10%, about 1% to about 7%, about 3% to about 9%, less than about 10%, or about 25% of the volume of the polymer resin. In some embodiments, the filler may be about 10% of the volume of the polymer resin or more, such as about 50% or about 75%. As the resin cures, the filler material does not shrink like the polymer resin. Thus, the volume of polymer resin displaced by the filler material provides a stable volume in the resulting composite material thereby reducing the overall shrinkage of the composite material. Such fillers may allow faster curing times while reducing shrinkage which typically occurs during fast cures. For example, the curing time of a polymer resin disclosed herein may be reduced to about 6 minutes or less, such as about 3 minutes or less, about 90 seconds or less, about 60 seconds, or about 40 seconds, while maintaining shrinkage of less than 3% by volume. Although the filler may help reduce or eliminate shrinkage, the filler may add to the cost of the polymer resin and composite component or increase the viscosity of the polymer resin. In an embodiment, the combination of one or more of the epoxy, polyurethane, thermoplastic, Group VIII metal material, or filler material may be configured to provide a net shrinkage of less than about 3% by volume and/or still exhibit a low enough viscosity to be sprayed from a spray tip at relatively low pressure.

When the viscosity of a polymer resin is relatively high (e.g., above about 90 psi), it may be more difficult to spray the polymer resin and may take longer time and/or higher line pressure to spray the polymer resin. In an uncured state, the polymer resins disclosed herein may exhibit relatively low viscosity (e.g., flow easily) at elevated temperatures and may be manually spread more easily or sprayed with a low cost tool, such as a pressure pot and sprayer, at a relatively low pressure (e.g., at or below about 90 psi) which may significantly reduce the high cost associated with a commercial liquid spray head, while providing a desired resiliency and/or mechanical failure profile to the cured composite laminate including the same. A polymer resin sprayer utilizing a pressure pot may be suitable for prototypes or low volume production of relatively small parts.

In some embodiments, the polymer resin may include an epoxy, a polyurethane, and one or more of at least one thermoset, at least one hardener, at least one Group VIII metal material, or at least one filler material. The one or more of the foregoing polymer resin components may be used in combination with each other in any of the respective volume amounts disclosed herein without limitation. For example, in an embodiment, the polymer resin may include polyurethane, epoxy, and at least one thermoplastic such as PEEK. The epoxy may be about 10% to about 35% of the polymer resin by volume, the thermoplastic may be about 1% to about 20% of the polymer resin by volume, and the polyurethane may make up the balance of the polymer resin. In an embodiment, the epoxy may be about 25% to about 35% of the polymer resin by volume, the thermoplastic may be about 3% to about 15% of the polymer resin by volume, and the polyurethane may make up the balance of the polymer resin.

In an embodiment, the polymer resin may include polyurethane, epoxy, and at least one Group VIII metal material. The epoxy may be about 10% to about 35% of the polymer resin by volume, the at least one Group VIII metal material may be about 0.1% to about 20% of the polymer resin by volume, and the polyurethane may make up the balance of the polymer resin. In an embodiment, the epoxy may be about 25% to about 35% of the polymer resin by volume, the at least one Group VIII metal material may be about 5% or less of the polymer resin by volume, and the polyurethane may make up the balance of the polymer resin.

In an embodiment, the polymer resin may include polyurethane, epoxy, and at least one filler material. The epoxy may be about 10% to about 35% of the polymer resin by volume, the at least one filler material may be about 1% to about 30% of the polymer resin by volume, and the polyurethane may make up the balance of the polymer resin. In an embodiment, the epoxy may be about 25% to about 35% of the polymer resin by volume, the at least one filler material may be about 1% to about 10% or about 3% to about 20% of the polymer resin by volume, and the polyurethane may make up the balance of the polymer resin.

In an embodiment, the polymer resin may include one or more of polyurethane, epoxy, at least one thermoplastic, at least one hardener, at least one Group VIII metal material, and at least one filler. When present, the epoxy may be about 10% to about 40% (e.g., about 10% to about 35% or about 25% to about 35%) of the polymer resin by volume, the thermoplastic may be about 1% to about 20% (e.g., about 3% to about 15%) of the polymer resin by volume, the at least one hardener may be present in a ratio of about 1:100 to about 1:3 (e.g., about 1:10 to about 1:3 or about 1:5 to about 1:3) of the polymer resin or component thereof by volume, the at least one Group VIII metal material may be about 0.1% to about 20% (e.g., about 10% or less or about 5% or less) of the polymer resin by volume, the at least one filler material may be about 1% to about 30% of (e.g., about 1% to about 10% or about 3% to about 20%) the polymer resin by volume, and the polyurethane may make up the balance (e.g., about 10% to about 90% or about 25% to about 75%) of the polymer resin by volume.

Apparatus and Methods for Applying Polymer Resin

The polymer resins disclosed herein may be applied to a fiber sheet, core, or other component of a composite structure by one or more of spraying or manually spreading (e.g., by trowel, roller, brush, or spatula). The polymer resin may be easily sprayed onto a fiber sheet using a pressure pot or container, at a much lower cost than conventional liquid spray heads. The pressure pot is a low cost alternative for prototype and low volume production of small parts. FIG. 1A is a simplified diagram of a pressure pot for spraying polymer resin in accordance with embodiments of the present disclosure. A pressure pot 100 (e.g., hot pressure pot or other pressurized container capable of maintaining or building pressure and heating a fluid) includes a pressure container 118 with a cover 116, each configured to hold increased pressure. The pressure container 118 holds a warm fluid (e.g., water) 102 therein to heat a liquid polymer resin 104 in a container 110. The container 110 may include a rigid and/or resilient container, such as a plastic bag. The container 110 may be constructed of a substantially inert material (e.g., substantially inert to the components of the polymer resin). A first tube 114 may be connected to the container 110 to provide one or more components of the resin 104 in a liquid form, and a second tube 112 may be connected to the container 110 to provide one or more different components of the resin 104 also in a liquid form.

Figure 1B:
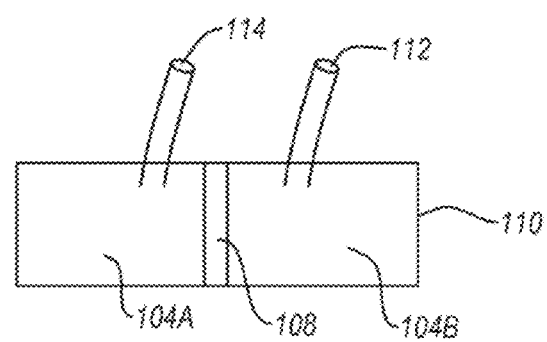
FIG. 1B is diagram of the container of FIG. 1A before mixing the polymer resin and the hardener.

FIG. 1B is a simplified diagram of the container of FIG. 1A before mixing a polymer resin and a hardener in accordance with embodiments of the present disclosure. Inside the container 110, a divider 108 may separate polymer resin 104A from a hardener 104B before spraying. A first tube 114 may be connected to the container 110 to provide the resin 104A in a liquid form, and a second tube 112 may be connected to the container 110 to provide the hardener 104B also in a liquid form. When the divider 108 is removed, the resin 104A and hardener 104B can be mixed. One of the first and second tubes 112 and 114 must be sealed or connected to a pressure source before placing the container 110 into the water 102 inside the pressure pot 118, while the other tube may be left open to act as an outlet for spraying the polymer resin. In an embodiment, the warm fluid may be a heated liquid (e.g., water) or gas (e.g., steam).

Figure 2:
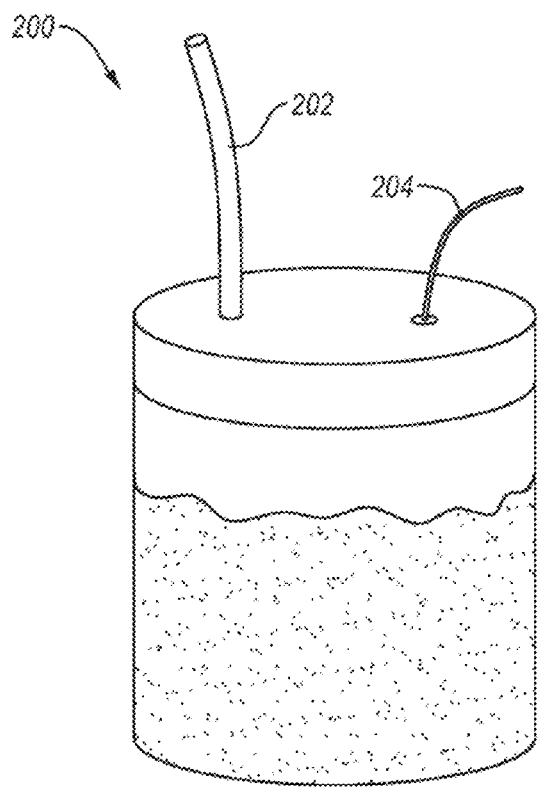
FIG. 2 is an isometric view of the pressure pot of FIG. 1A, according to an embodiment.

FIG. 2 is an isometric view of the pressure pot of FIG. 1A according to an embodiment. The pressure pot 200 includes an air connection 202 to an air outlet, which provides an air pressure of about 90 psi. The pressure pot 200 may spray the polymer resin from a connection 204 at a pressure of generally less than 90 psi, for example, 70 psi. In some embodiments, the pressure pot 200 may spray the polymer resin at an air pressure of about 105 psi. In some embodiments, one or more of the pressure pot 200 or the plastic bag therein may include an agitating element therein. Agitating elements may include an ultrasonic processor (e.g., Sonicator), stir bar, or other any vibrating or agitating member. For example, the pressure pot 200 may be configured as a ultrasonic bath having an adjustable temperature control.

Figure 3:
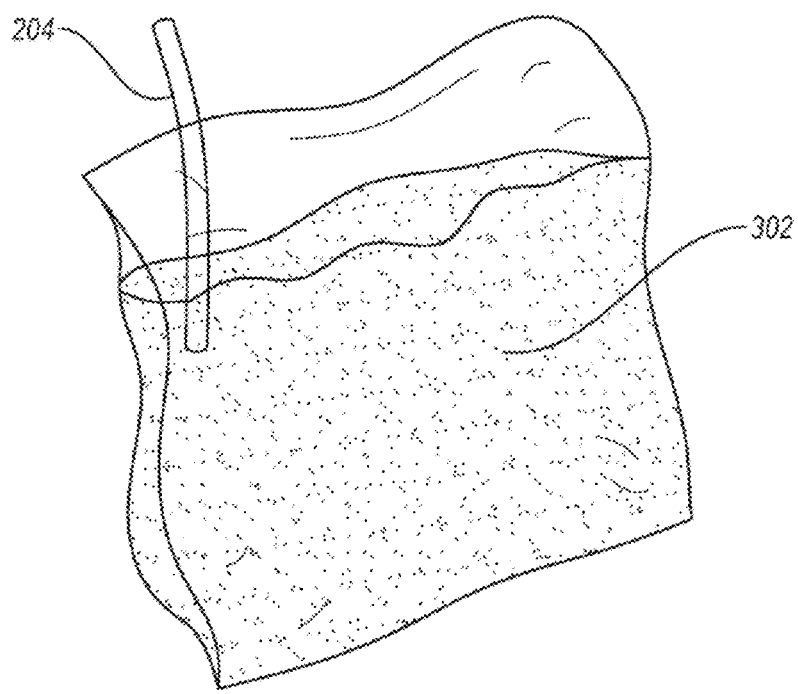
FIG. 3 is an isometric view of a container of FIG. 1A containing a polymer resin including a hardener, according to an embodiment.

FIG. 3 is an isometric view a plastic bag containing a polymer resin according to an embodiment. As shown, a plastic bag 302 (e.g., container) contains a premixed polymer resin including a hardener. The plastic bag may be placed into the pressure pot 200 for heating the polymer resin therein. The plastic bag 302 includes the connection 204 to output the polymer resin when the plastic bag is placed into the pressure pot 200. The plastic bag may be made of a plastic material selected to remain substantially inert to the polymer resin or components thereof.

Figure 4:
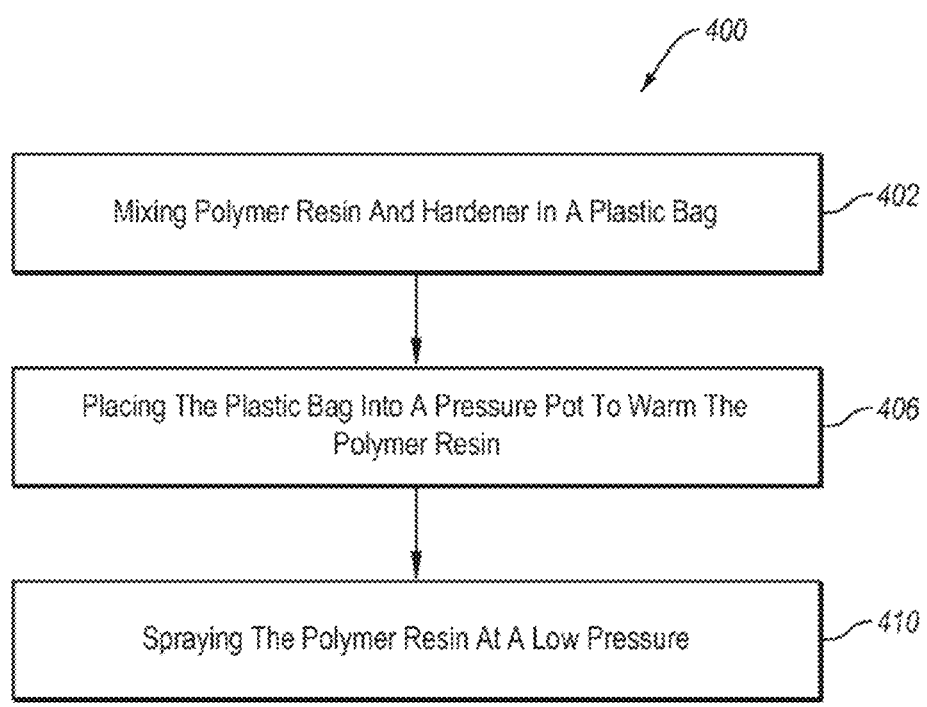
FIG. 4 is a flow chart of a method for spraying a polymer resin according to an embodiment.

FIG. 4 is a flow chart of a method for spraying a polymer resin in accordance with embodiments of the present disclosure. Method 400 starts with mixing resin and hardener in a container to form a polymer resin at act 402. The mixing may be performed by using hands or other tools to squeeze the bag at room temperature. Mixing may be aided by use of the agitating member. Mixing may include mixing one or more of a first thermoset (e.g., polyurethane), a second thermoset (e.g., epoxy), a Group VIII metal material (e.g., ferrites), a thermoplastic, a filler, or the hardener.

Method 400 includes with placing the container into a pressure pot to warm the polymer resin at act 406. The fluid temperature in the pressure pot may be below the temperature at which the hardener starts to cure. For example, the water may be maintained at an application (e.g., spraying) temperature below the curing temperature of the hardener, such as at about 50° C., while the hardener starts to cure at an elevated temperature, for example, about 70° C., when the polymer resin is a mixture of polyurethane and epoxy. The hardener may be chosen to obtain similar or the same curing time for the epoxy and polyurethane at the same temperature. The same or similar curing times may allow the two thermosets (e.g., epoxy and polyurethane) to complete curing together without lengthening the curing process due to one of the thermosets in the polymer resin remaining uncured for a longer period.

In another embodiment, when the polymer resin includes an epoxy, the water may be maintained at a higher application (e.g., spraying) temperature to reduce the viscosity, such as at about 80° C.-85° C. or less, while the hardener for the epoxy may start to cure at about 90° C. By preheating the polymer resin without starting to cure, the viscosity of the polymer resin may be reduced prior to application (e.g., to about 300 centipoise or less at about 70° C.), which makes it easier to spray the polymer resin at a low pressure. Also, the cure time for the polymer resin may be shortened by preheating the resin in the pressure pot, or a commercial spray system, because it may take less time for the preheated polymer resin to reach the gel point, and thus the polymer resin may cure in a shorter time.

In an embodiment, the polymer resin includes a mixture of a polyurethane and an epoxy and the temperature is selected to maintain the desired viscosity of the polymer resin without substantially curing the polymer resin. In an embodiment, the temperature may be selected to maintain the polymer resin at a viscosity below about 300 centipoise without curing the polymer resin. The temperature in the pressure pot may be about 90° C. or less, such as about 40° C. to about 85° C., about 50° C. to about 70° C., about 50° C., about 80° C., or about 65° C. or less to maintain the viscosity of the polymer resin below about 300 centipoise.

Method 400 also includes spraying the polymer resin at a low pressure at act 410. The (low) pressure may be provided from an air outlet, which is generally 90 psi. By using the air source from the air outlet, no extra compressor or the like is needed. The spraying pressure may be lower than 90 psi for safety, for example, 70 psi may be used.

One of the benefits of using the polymer resin to impregnate the fibers of a fiber sheet is to allow the use of the low pressure to easily spray the polymer resin via the pressure pot or a commercial spray system. The polymer resin may include a mixture of a thermoset with a high viscosity at room temperature (e.g., about 50-70 mPa·s or more) and a thermoset with a low viscosity at room temperature (e.g., below about 40 mPa·s), and optionally may also include one or more of a thermoplastic (e.g., comingled fibers) for improving toughness, a Group VIII metal material for stabilizing the reaction of the polyurethane and epoxy, and/or a filler material for reducing shrinkage. The polymer resin mixture may be composed such that the polymer resin has a low viscosity, which may be further reduced by warming the polymer resin in the pressure pot before spraying as described above. Other, commercial liquid spray heads may also be used to spray the polymer resin. However, commercial liquid spray heads are much more expensive than the pressure pot. Therefore, the tooling cost for spraying the polymer resin is significantly reduced when using the pressure pot. The commercial liquid spray heads may be more suitable for and used in high volume production of large parts and may be used with any of the embodiments disclosed herein.

Carbon Fibers and Recycled Fibers from RTM Waste

The carbon fibers may be supplied by bundles, such as by TORAY 1 k, 3 k, 6 k, 12 k, 24 k, and 48 k. The carbon fibers may also include some binders on the outer surface of the fibers, such that the fibers can be bundled together when the carbon fibers are heated to an elevated temperature. Fiber waste from the RTM may be very high, for example, up to about 40%, depending upon the shape or geometry of the product. The fiber waste may be generated by cutting the excess fiber from a virgin (e.g., unused) fiber sheet prior to the RTM operation. The fiber waste is normally in a sheet form without any resin from the RTM. The excess or waste fibers may be recycled for later use. Recycled fiber sheets may be formed from the waste fiber of any type, such as carbon fibers, glass fibers or plastic fibers. Specifically, the waste fiber sheet may be first chopped into smaller squares, such as 35 by 35 mm$^2$. Then, the smaller squares of waste fiber sheet may be pulverized to break the bundles into filaments or individual fibers, which may be formed into recycled fiber sheets. The recycled fiber sheets are much cheaper than the virgin fibers.

Figure 5:
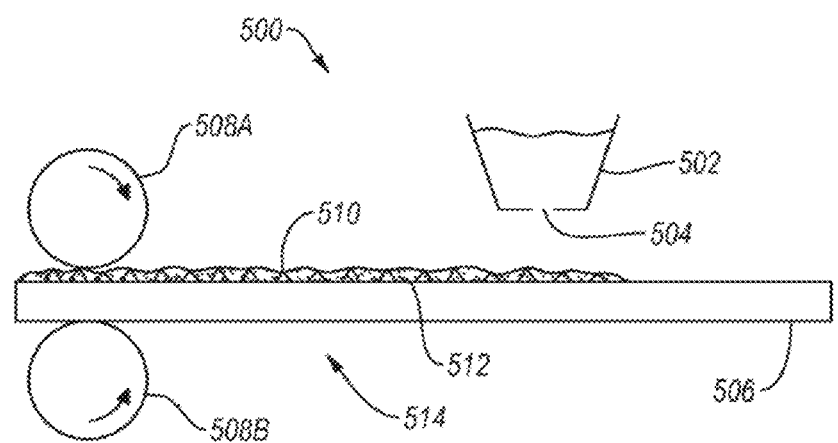
FIG. 5 is a schematic of a device for forming recycled fiber sheets according to an embodiment.

FIG. 5 illustrates a simplified device for forming recycled fiber sheets in accordance with embodiments of the present disclosure. Device 500 may include a moving belt 506, a hopper 502, and two rollers 508A-B. To fabricate fiber sheets from recycled fibers, the filaments may be deposited on the moving belt 506 through the hopper 502, including an opening 504 at the bottom of the hopper 502, which may be shaken to randomly dispose discontinuous fibers 512 over the belt 506 through the opening 504. The moving belt 506 may pass through two hot rollers 508A-B to form a fiber sheet 510, which includes randomly oriented discontinuous fibers 512, and may be nearly quasi-isotropic because the fibers are slightly oriented along the moving direction of the belt 506. The two rollers 508A-B may be heated to an elevated temperature, for example, about 80° C., such that the fibers are bonded together by binders on the outer surface of the fibers.

Figure 6:
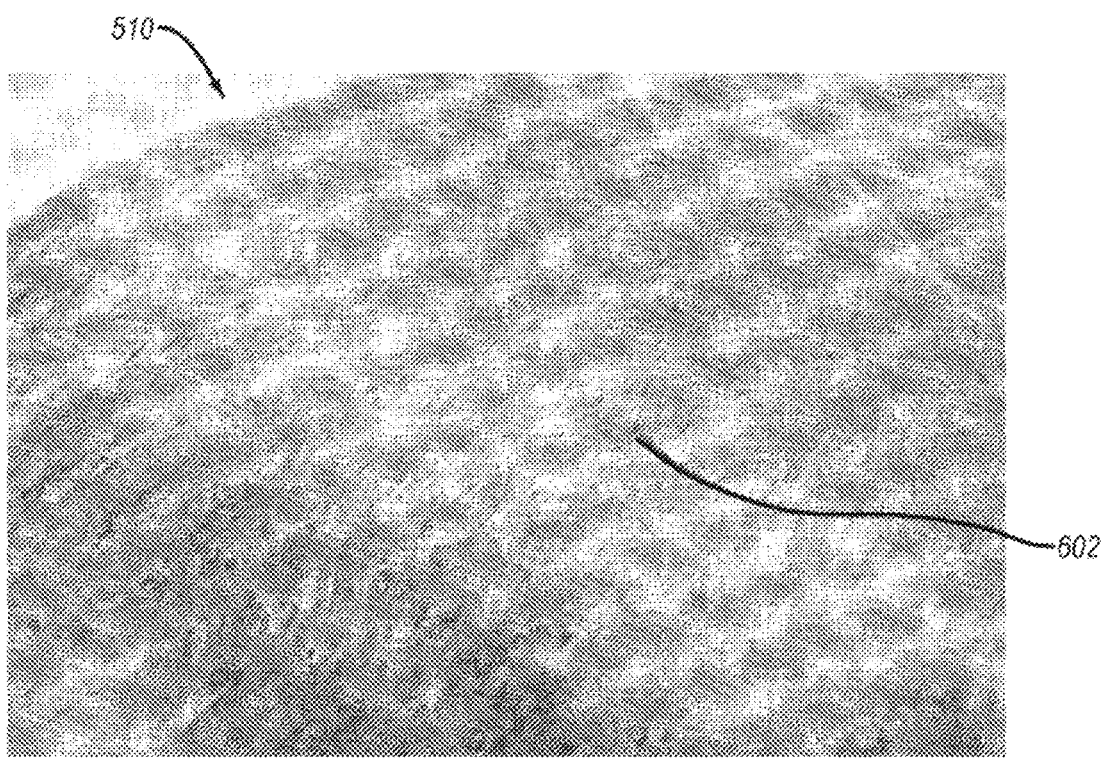
FIG. 6 is a photograph of the fiber sheets of FIG. 5 after needling in accordance with embodiments of the present disclosure.

FIG. 6 is a photograph of the fiber sheets 510 of FIG. 5 after preparation in accordance with embodiments of the present disclosure. The fiber sheet 510 may be needled to form holes 602 to allow the polymer resin to flow through the fibers to form a composite laminate, as shown in FIG. 6. The polymer resin embeds the randomly oriented discontinuous fibers.

Figure 7:
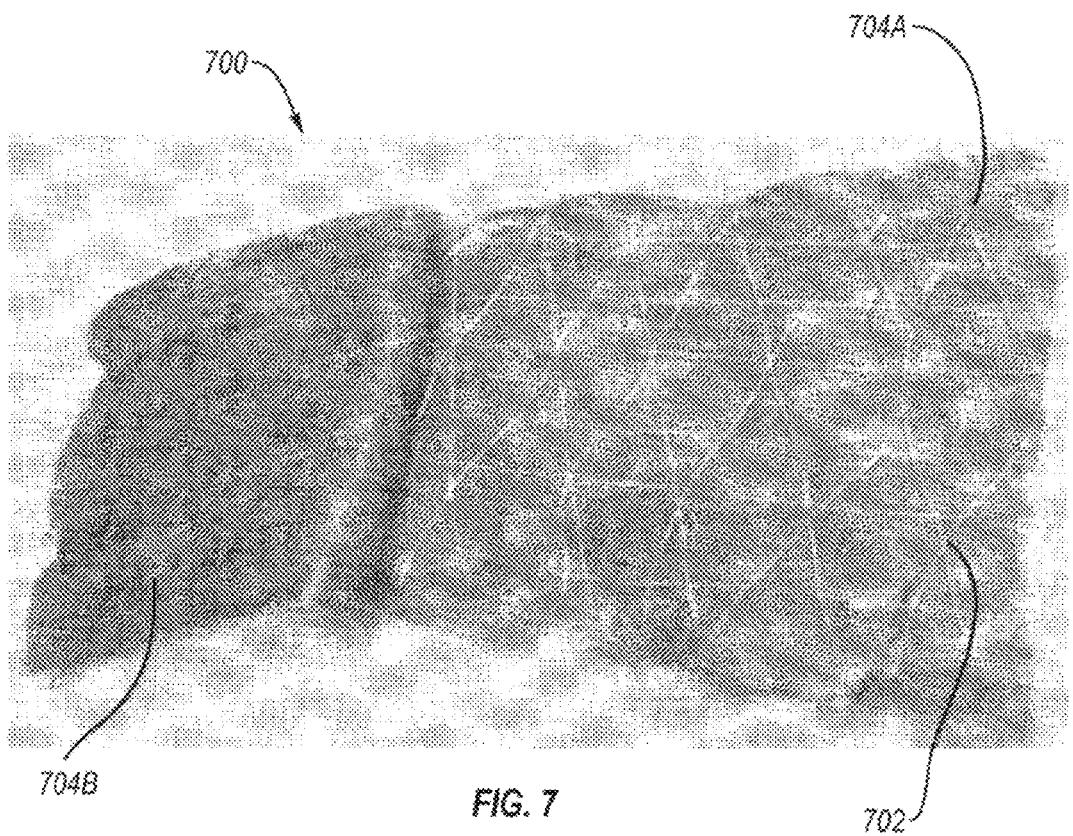
FIG. 7 is a photograph of the fiber sheets of FIG. 5 with a mesh between two fiber sheets in accordance with embodiments of the present disclosure.

Multiple fiber sheets may be used for forming a composite laminate (e.g., one or more layers forming a single layer over the core) or skin. FIG. 7 is a photograph of the fiber sheets of FIG. 5 with a mesh between two fiber sheets in accordance with embodiments of the present disclosure. Multiple fiber sheets 700 includes a plastic mesh 702 placed between two fiber sheets 704A and 704B, as shown in FIG. 7. The mesh 702 may help retain the discontinuous fibers in the sheets. The mesh 702 may be formed of a plastic, including, but not limited to, nylon or polyamide.

Polymer Resin for Forming a Composite Sandwich

The polymer resin may be used in forming a composite structure, including a core sandwiched between at least two composite laminates ("composite sandwich"), such as one or more composite laminates on each side of the core. In some embodiments, the polymer resin may include a liquid mixture of a first thermoset and a second thermoset, which may impregnate the fiber sheets to form composite laminates, which may bond to the ends of the core to form the composite sandwich. In some embodiments, the polymer resin may include a mixture of one or more thermosets and a thermoplastic, such as epoxy or polyurethane with comingled thermoplastic fibers (e.g., PEEK fibers). The polymer resin may include one or more hardeners therein. The one or more hardeners may be composed to cause one or more of the polyurethane or the epoxy to cure. In some embodiments, the polymer resin may include a filler material. In some embodiments the polymer resin may include at least one Group VIII metal material. In some embodiments, the polymer resin may include a liquid mixture of a first thermoset, a second thermoset, and one or more additional materials, such as at least one hardener, at least one Group VIII metal material, at least one filler material or at least one thermoplastic. In some embodiments, the polymer resin may include a single thermoset, such as polyurethane or epoxy, and one or more additional materials, such as at least a second thermoset, at least one hardener, at least one Group VIII metal material, at least one filler material, or at least one thermoplastic. The polymer resin may be sprayed to the fiber sheet 510 using the pressure pot 100 or 200 or a commercial spray system, or may be manually applied to the fiber sheet 510 as disclosed herein. The fiber sheet may be needled to form holes to allow the polymer resin to flow through to contact the end of the core, which may be formed of plastic tubes.

The core may be a "soft" core or a "hard" core. The "soft" core may include paperboard, cardboard, low density foam, and the like. The "hard" core may include a plurality of cells defined by plastic tubes, high density foams, honeycomb, or the like.

The polymer resin may also be used to form a composite laminate such as any of those disclosed herein. U.S. Provisional Patent Application No. 62/007,652, entitled "Composite Laminate Free of Surface Defects," filed on Jun. 4, 2014, discloses details on apparatus and methods for fabricating composite laminate free of surface defects, such as pin holes, which is incorporated herein by reference in its entirety. Commercially acceptable vehicle body components may require the surface to be substantially free of pin holes, porosity or other surface defects, such that the surface may exhibit a polished (e.g., shiny) surface finish. The low cost techniques herein have been developed to fabricate composite components free of surface defects.

Figure 8:
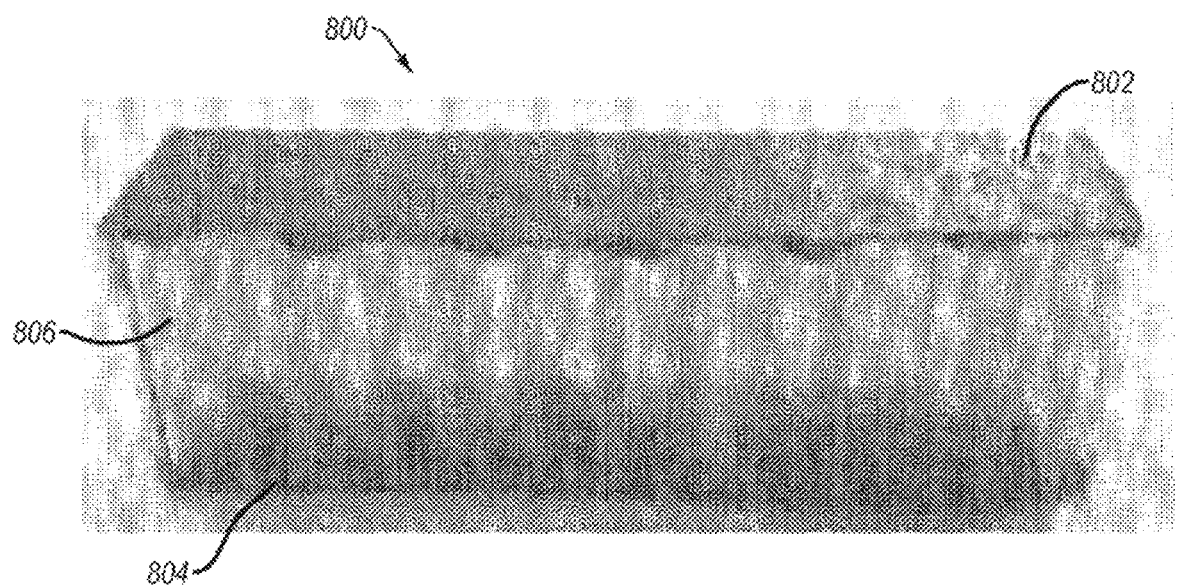
FIG. 8 is a photograph of a composite sandwich including a core made of drinking straws in accordance with embodiments of the present disclosure.

FIG. 8 is a photograph of a composite sandwich including a "hard" core made of drinking straws in accordance with embodiments of the present disclosure. Composite sandwich 800 includes a top composite laminate 802 or skin, a core formed of plastic drinking straws 806 bundled together, and a bottom composite laminate 804.

The top composite laminate 802 and the bottom composite laminate 804 include a polymer matrix that embeds the discontinuous carbon fibers randomly oriented. The polymer matrix includes a mixture of epoxy and polyurethane foams, which is formed during curing the liquid mixture of epoxy and polyurethane. The carbon fibers provide the reinforcement of the composite laminates 802 and 804. It will be appreciated by those skilled in the art that the polymer resin may be used for any fiber reinforced composites. The fibers may be carbon fibers, glass fibers, or plastic fibers, such as polyamide (PA), poly(ethylene terephthalate) (PET), polypropylene (PP), or polyethylene (PE).

In some embodiments, as explained in more detail below, the composite laminates may also include oriented or aligned continuous fibers embedded in a polymer matrix. The oriented or aligned continuous fibers may have a higher performance than the discontinuous fibers and may be cosmetically more appealing than the discontinuous fibers, such as woven fibers, but at a higher cost. The laminate including the oriented continuous fibers may not stretch like the laminate including discontinuous fibers. The discontinuous fibers may be low cost recycled carbon fibers, for example, recycled fibers from waste fibers from the RTM or other sources. The waste fibers may cost less than the unused virgin fibers.

The polymer resin may have a gel time of about 40 seconds at about 130° C. The polymer resin may be cured at about 130° C. in a few minutes. The curing time may vary with the supplier of the epoxy. For example, a fast curing epoxy EP05475 from Momentive may cure slower than an epoxy Voraforce 7500 from DOW Chemical. Specifically, the curing time may take about 5 minutes for the epoxy from Momentive, while the curing time for the epoxy from DOW Chemical may take about 3 minutes or less. When the polymer resin is cured, the polyurethane may form micro-foams via a reaction with water (e.g., condensation or small amounts of contaminant water) associated with polyurethane or the epoxy in the polymer resin. In some embodiments, the water or moisture in or adjacent to the polymer resin may be converted to steam by the heat of the curing process (e.g., at about 130° C.) which may cause a reaction with the polymer resin, thereby forming a foam in the polymer resin. The polymer resin may shrink during curing. The shrinkage can be measured after curing. The polymer resin may have a relatively low shrinkage after curing, such as equal to or less than 3% in any dimension. Low shrinkage is desired to help produce composite components with dimensional accuracy and consistency.

The carbon fibers may be dried prior to applying the polymer resin because the polyurethane in the polymer resin may chemically react with the moisture in the fibers at an elevated temperature as explained above. In some embodiments, such chemical reaction resulting in foaming may not be desirable.

The polymer resin, including a mixture of a first thermoset (e.g., epoxy) and a second thermoset (e.g., polyurethane), optionally including a thermoplastic (e.g., comingled thermoplastic fibers) for improving toughness (e.g., resiliency) of the cured polymer resin or filler material, may have several benefits over the thermoset alone. As discussed above, the polymer resin including a mixture of epoxy and polyurethane bonds well with the plastic tubes and does not separate therefrom (e.g., peel off) like epoxy resin alone. The micro-foams (e.g., polyurethane foams) formed from mixing and/or during curing attach to the "hard" core (e.g., plastic tubes) very well, such that the composite laminates do not peel off the "hard" core. For example, the micro-foams so formed may at least partially extend into the cells or at least partially fill the cells (e.g., extend into the open ends of the plastic tubes a distance) to form a strong mechanical bond with the "hard" core. In contrast, a conventional epoxy in the composite laminate does not adhere to the "hard" core due to the lack of foam (e.g., micro-foam) therein, rather the composite laminates were found to easily peel off of the ends of the "hard" core.

Additionally, the polymer resin may also be different from the polyurethane such as VITROX used in the Bayer Preg. For example, the polyurethane micro-foams may allow water permeation therethrough and may be softer than the epoxy. The polymer resin including a mixture of epoxy and polyurethane can provide a hard surface for the composite sandwich and can also be more water resistant than the polyurethane alone. In some embodiments, a higher amount of epoxy may be used to impart a watertight character to the surface of the cured composite part. In some embodiments, a layer or layers of epoxy or polymer resins having larger volume % of epoxy may be placed over one or more sides of the polymer resin to impart a watertight character thereto.

The polymer resin can transfer load between fibers. One thermoset may have a better load transfer capability than another thermoset. For example, the epoxy is harder than polyurethane and, thus, has a better load transfer capability for fibers than the polyurethane such that a mixture of two thermosets (e.g., the mixture of epoxy and polyurethane), optionally a thermoplastic (e.g., comingled thermoplastic fibers) can have improved mechanical performance. One thermoset may have a higher resiliency than another thermoset upon curing. For example, the polyurethane is more resilient than the epoxy (e.g., epoxies undergo brittle failure (crumbling) at lower pressures than polyurethanes) and may allow a part including the same to flex or bend instead of break.

Composite Sandwich Structures

The polymer resins and fibers disclosed above may be used to make composite structures such as a composite sandwich as disclosed below. A composite laminate suitable for use in the composite structures herein may be formed using one or more layers of fibers (e.g., fiber sheets) at least partially bound in a polymer resin. Any of the polymer resins disclosed herein may be used to form any of the composite laminate structures disclosed herein, without limitation.

Figure 9:
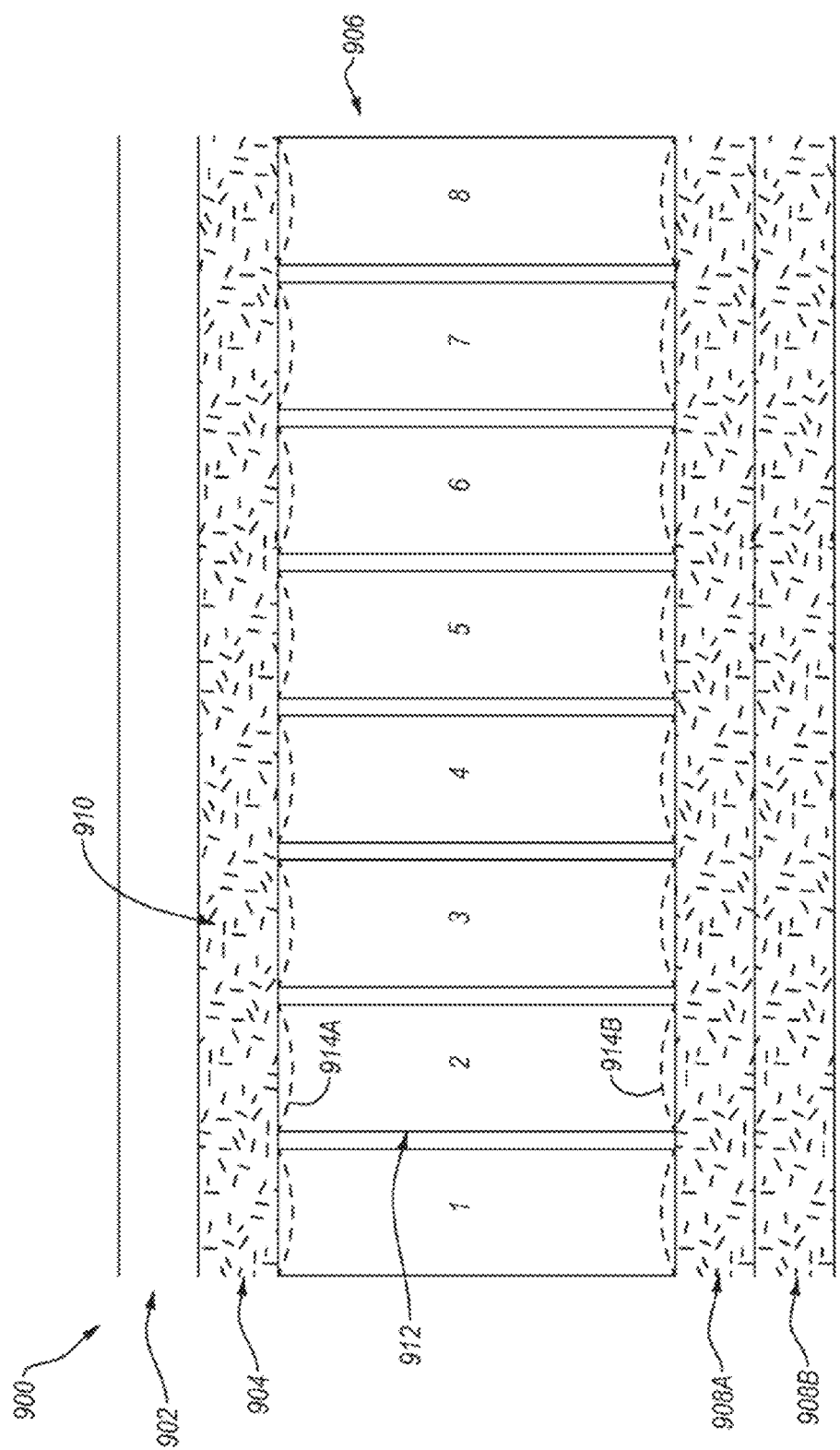
FIG. 9 is cross-sectional view of a composite sandwich according to an embodiment.

FIG. 9 illustrates a composite sandwich according to an embodiment. As shown, a composite sandwich 900 may include a core 906 sandwiched between composite laminates. Specifically, composite sandwich 900 may include one or more composite laminates (e.g., one or more composite laminate layers), such as two composite laminates 908A-B at the bottom of the core 906, and a top composite laminate 904. In some embodiments, the core 906 may include one or more "hard" components such as formed from a plurality of cells defined by corresponding cell walls (e.g., plastic tubes such as drinking straws or other equivalent structures). The core 906 may include a plurality (e.g., bundle) of at least similarly oriented tubular members (e.g., polycarbonate cells such as drinking straws), such as tubes 1 and 2. The tubes may be bonded together such as by integral formation (e.g., extruded or molded together), an adhesive, thermal bonding (e.g., melting) such as being bonded together after being individually extruded, or any other suitable attachment means. The tubes may be composed to at least partially soften or melt upon application of a specific amount of heat. For example, the tubes may be composed to soften or melt and at least partially compress, while in a mold such that the resulting sandwich structure may at least partially comply with the shape of a mold. The length of each of the tubes prior to compression may be selected to provide a desired amount of compliance upon application of heat and/or pressure thereto. For example, the length or height of the tubes may be about 100 μm to about 10 cm, about 1 mm to about 5 cm, about 5 mm to about 3 cm, about 250 μm to about 1 cm, about 1 cm to about 5 cm, about 1 mm to about 5 mm, about 5 mm to about 1 cm, about 7 mm, or about 1 cm. The tubes may exhibit a substantially similar height and/or diameter. For example, the tubes may exhibit a diameter of about 1 mm or more, such as about 1 mm to about 5 cm, about 3 mm to about 3 cm, about 5 mm, to about 1 cm, about 6 mm, less than about 2 cm, or less than about 1 cm. While the cells (e.g., tubes) depicted herein have a circular cross-sectional shape, the cells may exhibit substantially polygonal cross-sectional shapes (e.g., triangular, rectangular, pentagonal, etc.), elliptical cross-sectional shapes, or amorphous shapes (e.g., having no set pattern or being a combination of circular and polygonal), when viewed along the longitudinal axis thereof. The cells may be defined by a single integral structure with common walls between adjacent cells or tubes. While the term "cells" or "tubes" is used herein, in some embodiments the cells or tubes may include on one or more closed ends; or exhibit configurations other than tubular (e.g., circular), such as polygonal (e.g., a plurality of closed or open pentagonal cells), or configurations not having connected sides therebetween (e.g., baffles).

In some embodiments, the core 906 may include a "soft" component such as paper board or card board. Paper board or card board may provide sound dampening characteristics to the resulting sandwich structure. In some embodiments, the composite sandwich may include one or more layers of soft and/or hard components, such as in the core or having alternating cores of soft and hard components with one or more composite laminates therebetween. In some embodiments, the composite sandwich may include one or more core materials in one or more composite laminates (e.g., interposed between 908A and 908B). In some embodiments, the composite sandwich may include one or more core materials between composite laminates.

The composite laminates 904 and 908A-B may be formed of fibers 910, such as randomly oriented discontinuous fibers (e.g., those shown in FIGS. 6 and 7) as depicted, or continuous fibers, with cured polymer resin therein. The fibers may include any fibers disclosed herein, such as carbon fibers.

In some embodiments, the top composite laminate 904 may slightly imprint (e.g., extend into) toward one end of the core 906 into each of the cells (e.g., tubes) between sidewalls 912 such as by extending toward a point therein, as shown by dashed line 914A. The bottom composite laminates 908A and 908B may also slightly imprint toward an opposite end of each tube (e.g., tubes 1-8) between sidewalls 912 such as by extending toward a point therein, as shown by dashed line 914B. Such imprinting may provide mechanical bond between the core 906 and the composite laminate layer extending therein. The laminates may imprint to a larger extent adjacent to the middle of each tube opening or cell, due to the distance from the sidewall that supports the composite laminate. The imprint or protrusion of the composite laminates 908A or 908B may cause a corresponding indentation on the adjacent outer layers of the composite material, which may extend to the surface of the composite material in the composite sandwich. Such a phenomenon is referred to as "print-through." The print-through may be deeper adjacent to the center of the open end portion of tubes than near the sidewalls 912. The composite laminates 904 and 908A and 908B may have print-through from the core 906 resulting in surface depression or divots in one or more portions of the composite sandwich 900, such as in the composite laminate 904, 908A or 908B, and/or a non-crimp fabric layer. In some embodiments (not shown), the polymer resin may extend substantially entirely into the core 906 from one or both sides thereof.

The individual composite laminate layers may be about 0.2 mm thick or more when a polymer resin that embeds the fibers is cured. The resulting composite sandwiches, having one or more layers of composite laminates and/or cores, may be about 0.4 mm thick or more, such as about 0.4 mm thick to about 20 cm thick, about 0.6 mm thick to about 10 cm thick, about 2 mm thick to about 5 cm thick, about 5 mm thick to about 2 cm thick, about 1 mm thick, or about 5 mm thick.

The composite sandwich 900 may also include a non-crimp fabric ("NCF") 902 reinforcement or a woven fabric on top of the composite laminate 904. The NCF may be composed of two or more plies or layers of unidirectional continuous fibers or in some cases randomly oriented discontinuous fibers, or a mixture thereof. Each individual layer may be oriented in a different axis or a different angle with respect to another layer, for example, 0° and 90°, or 45° among any other angles. Depending upon the number of layers and orientations of each layer, a unidirectional, bi-axial, tri-axial or greater configuration can be assembled into one NCF fabric system. The NCF or woven fabric may include a polymer resin therein. The polymer resin may be configured to provide a satisfactory surface finish to the composite sandwich 900. In an embodiment, the NCF 902 may have bi-axial configuration (e.g., fibers having a relative 0° and 90° relationship therebetween). The bi-axial NCF has bi-directional strength and stiffness and flexible strength and stiffness. The NCF may provide greater pull out loads or tensile strength in highly loaded areas than the composite laminates alone. The NCF 902 may also reduce print-through from the composite core. The composite sandwich 900 may be used for producing automobile floors among other applications. The composite 900 sandwich may also be used for an automobile body (e.g., finished surface) with the NCF 902 facing outside of the automobile body. The composite sandwich 900 may also include another NCF (not shown) on the bottom composite laminates 908A-B to increase the toughness (e.g., pull out load) of the composite sandwich.

Figure 10:
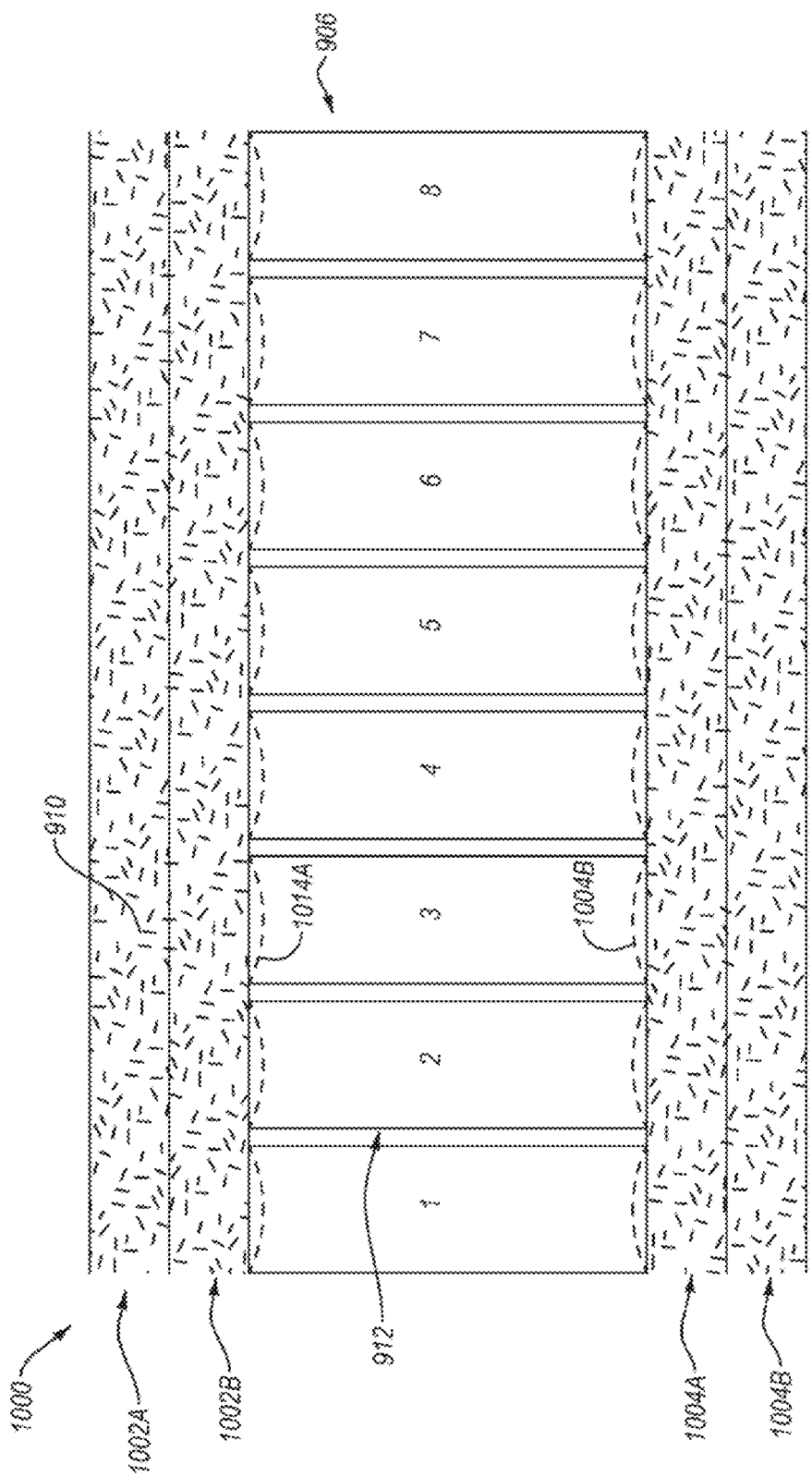
FIG. 10 is a cross-sectional view of composite sandwich according to an embodiment.

FIG. 10 illustrates a composite sandwich in accordance an embodiment. As shown, the composite sandwich 1000 may include a light weight core sandwiched between composite laminates. Specifically, the composite sandwich 1000 may include one or more composite laminates. For example, two composite laminates 1004A-B on the bottom of the core 906, and two top composite laminates 1002A-B on top of the core 906. Each of composite laminates 1002A-B and 1004A-B may be formed from fibers 910, such as a fiber sheet or a fiber mesh including randomly oriented discontinuous fibers (e.g., those shown in FIGS. 6 and 7) as depicted, or continuous fibers, with cured polymer resin. The composite laminates 1002A-B and 1004A-B may also have print-through from the core 906. The top composite laminates 1002A and 1002B may slightly imprint toward one end of each tube (e.g., tubes 1-8) between sidewall 912 such as by extending toward a point therein, as shown by dashed line 1014A. Similarly, the bottom composite laminates 1004A and 1004B may slightly imprint toward an opposite end of each tube such as by extending toward a point therein, as shown by dashed line 1014B. The laminates may imprint to a larger extent near middle of each tube, due to the distance from the sidewall(s) 912 that supports the composite laminate. In an embodiment, the composite sandwich 1000 may not include a NCF, such that it may have a lower pull out load than composite sandwich 900 including NCF(s). The composite sandwich 1000 may not have the same cosmetic appeal as the composite sandwich 900 due to the randomly oriented fibers in the composite laminates of composite sandwich 1000, but may be used for fabricating components, including front and rear bulkhead for cars.

In some embodiments, the core 906 may be formed of a plurality of tubes (e.g., a unitary structure including a plurality of co-extruded polycarbonate tubes sharing common walls), similar to drinking straws. In some embodiments, the core 906 may be formed of a plurality of tubes (e.g., tubular cells or members) that are individually extruded and bonded together thereafter. The core may have a density of about 70 kg/m$^3$ and a cell height of about 7 mm. The core 906 may have a density of about 20 kg/m$^3$ or more such as about 20 kg/m$^3$ to about 150 kg/m$^3$, about 40 kg/m$^3$ to about 100 kg/m$^3$, about 60 kg/m$^3$ to about 80 kg/m$^3$, or about 65 kg/m$^3$ to about 75 kg/m$^3$. The core may have an initial cell height of about 100 μm to about 10 cm, about 1 mm to about 5 cm, about 5 mm to about 3 cm, about 250 μm to about 1 cm, about 1 cm to about 5 cm, about 1 mm to about 5 mm, about 5 mm to about 1 cm, about 7 mm, or about 1 cm. The use of polycarbonate, polyethylene, polypropylene, or other plastics in the core may provide a greater resistance to tearing upon application of tension to the core than is found in cardboard or paper board. For example, the core may include a plurality of integrally formed polycarbonate tubes (e.g., a plurality of open-ended structures bound together), which may collectively bend or otherwise distort in one or more regions upon application of, tension, heat, and/or pressure in a mold, whereas cardboard may tear under the same conditions. In some embodiments, the core may bend, compress, or stretch in one or more regions therein, depending on the geometry of the mold and desired finished dimension of a part including the same.

In some embodiments, the core may be fully compressed to form a solid or may be partially compressed to reduce the core height. The compressed core height may be about 15% or more of the initial core height, such as about 15% to about 90%, about 25% to about 75%, about 40% to about 60%, about 15% to about 50%, or about 15% of the initial core height. It will be appreciated that the number of composite laminates may vary at the top and the bottom of the composite sandwich, such as having different layers or materials therein. The dimension and density of the core may vary, such as having more cells (e.g., tubes) in one or more regions thereof, having larger or smaller diameter cells in one or more regions thereof than in adjacent regions, having one or more regions including tubes having different (e.g., smaller or larger) wall thicknesses than tubes in adjacent regions, or combinations of any of the foregoing. The weight of the fiber sheet or NCF may vary.

One or more of the reinforced carbon fiber (RCF) sheets or plies (e.g., 908A, 908B, 904, 1002A, 1002B, 1004A, 1004B) formed with randomly oriented discontinuous fibers may have a mass or weight of about 150 g/m$^2$ or more, such as about 150 g/m$^2$ to about 500 g/m$^2$, about 175 g/m$^2$ to about 350 g/m$^2$, about 200 g/m$^2$, or about 300 g/m$^2$. The carbon fibers in the RCF sheet may be recycled fibers or virgin fibers. The RCF may include waste fibers, such as from dry NCF waste, dry resin transfer molding (RTM) waste, or other left over dry fibers. For example, Toray T700 60E carbon fiber may be cut from dry NCF waste to a 35 mm fiber, and then formed into randomly oriented fiber sheet with an areal density of about 200 g/m$^2$. An additional layer of NCF may have a mass or weight of about 300 g/m$^2$ to further strengthen the composite.

Figure 11:
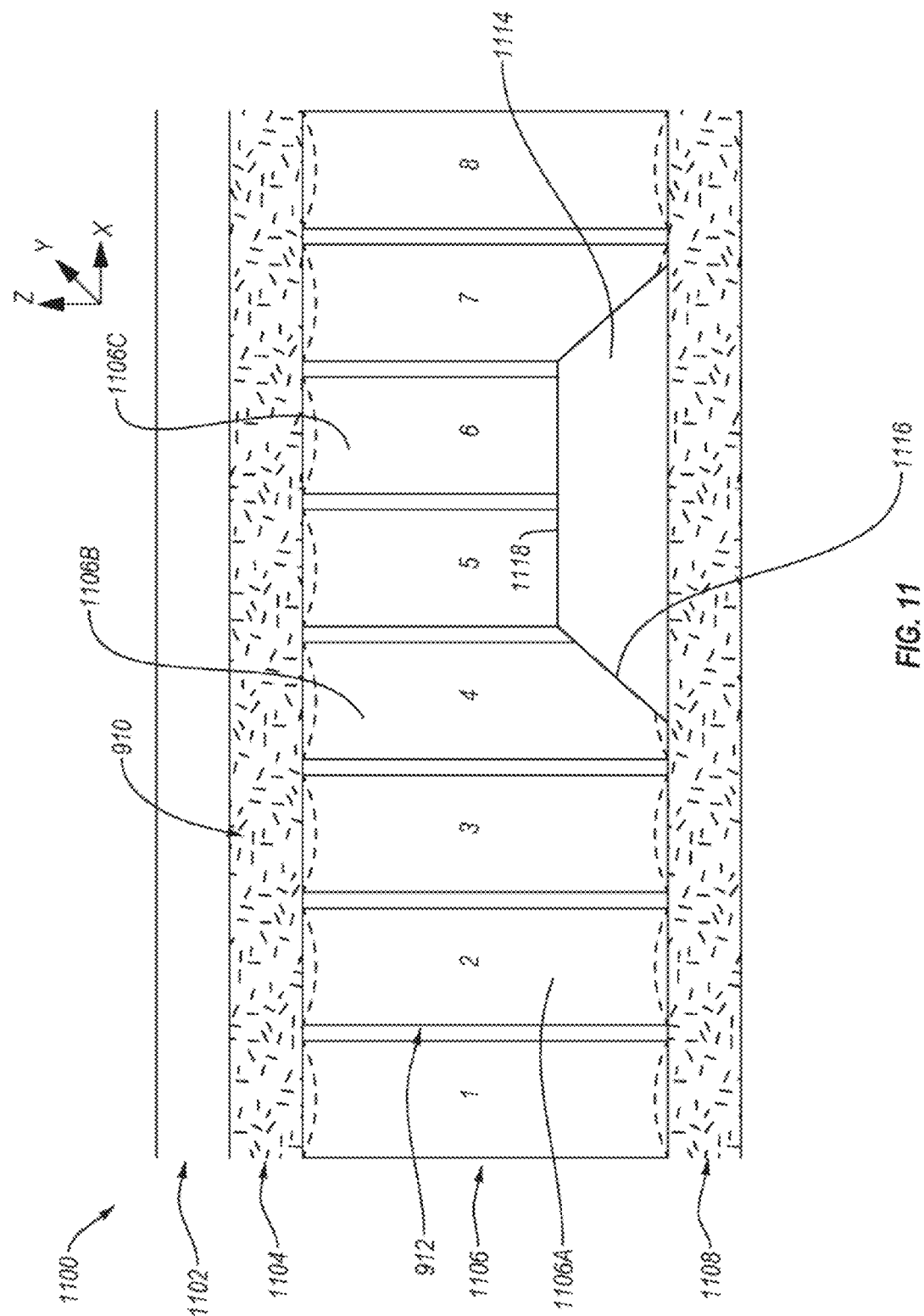
FIG. 11 is a cross-sectional view of a component formed of a composite sandwich, a metal insert, and reinforced with a NCF according to an embodiment.

FIG. 11 is a cross-sectional view of an embodiment of a component formed of a composite sandwich, a metal insert, and reinforced with a NCF. As shown, component 1100 may include a composite core 1106 between one or more top composite laminates 1104 and one or more bottom composite laminates 1108. Each of composite laminates 1104 and 1108 may be formed from fibers, such as a fiber sheet or a fiber mesh including randomly oriented discontinuous fibers (e.g., those shown in FIGS. 6 and 7) as depicted, or continuous fibers, with cured polymer resin. The component 1100 may include a metal insert 1114 between the core 1106 and one or more composite laminates, such as composite laminate 1108. The metal insert 1114 may include one or more surfaces extending parallel to the layers of the composite sandwich, such as the non-slope region 1118. The metal insert 1114 may include one or more surfaces extending non-parallel to the layers of the composite sandwich, such as the slope region(s) 1116. In some embodiments, the insert may be a non-metal such as a polymer or a ceramic. In some embodiments, one or more of the top or bottom composite laminates may include one or more layers of composite laminates and/or NCF.

The composite core 1106 may be partially compressed or fully compressed around the metal insert 1114 to at least partially conform to the shape of the metal insert 1114. The composite core 1106 may include one or more of an uncompressed portion 1106A, a partially compressed transition portion 1106B, and a fully compressed (e.g., solid) portion 1106C surrounding the metal insert 1114. The partially compressed transition portion 1106B may be positioned between the fully compressed 1106C and the transition portion 1106B along the slope region 1116 of the metal insert 1114. In some embodiments, the metal insert may include, but not be limited to, a light weight metal, such as aluminum, titanium, magnesium, alloys including one or more of the same, or combinations of any of the foregoing. The fully compressed portion 1106C may be located above the non-slope region 1118.

Component 1100 may also include a NCF 1102 on top of the top composite laminates 1104. The NCF 1102 may provide greater pull out load at a direction substantially parallel to the composite laminate (along Y axis) plane, substantially perpendicular to the cross-section (X-Z plane) of the component 1100 as shown in FIG. 11.

A composite sandwich including a NCF may provide enough strength to allow the composite sandwich, such as shown in FIGS. 9 and 11, to be used for seat mountings in automobiles. The seat mounting may require the composite to have a high pull out load. If the seat mounting is formed of a composite sandwich including a NCF on top (e.g., outermost to) of at least one of the composite laminates or on both the top composite laminates and bottom composite laminates, the NCF may help prevent a seat belt from pulling out of the seat mounting. For example, when a car stops suddenly, the seat belt may be pulled suddenly thereby applying a pull out load on the seat mount, which may pull through the composite laminate. By adding the NCF, the pull out load can be increased to provide more support such that the seat belt may not pull out from the composite laminates of the seat mount.

Figure 12:
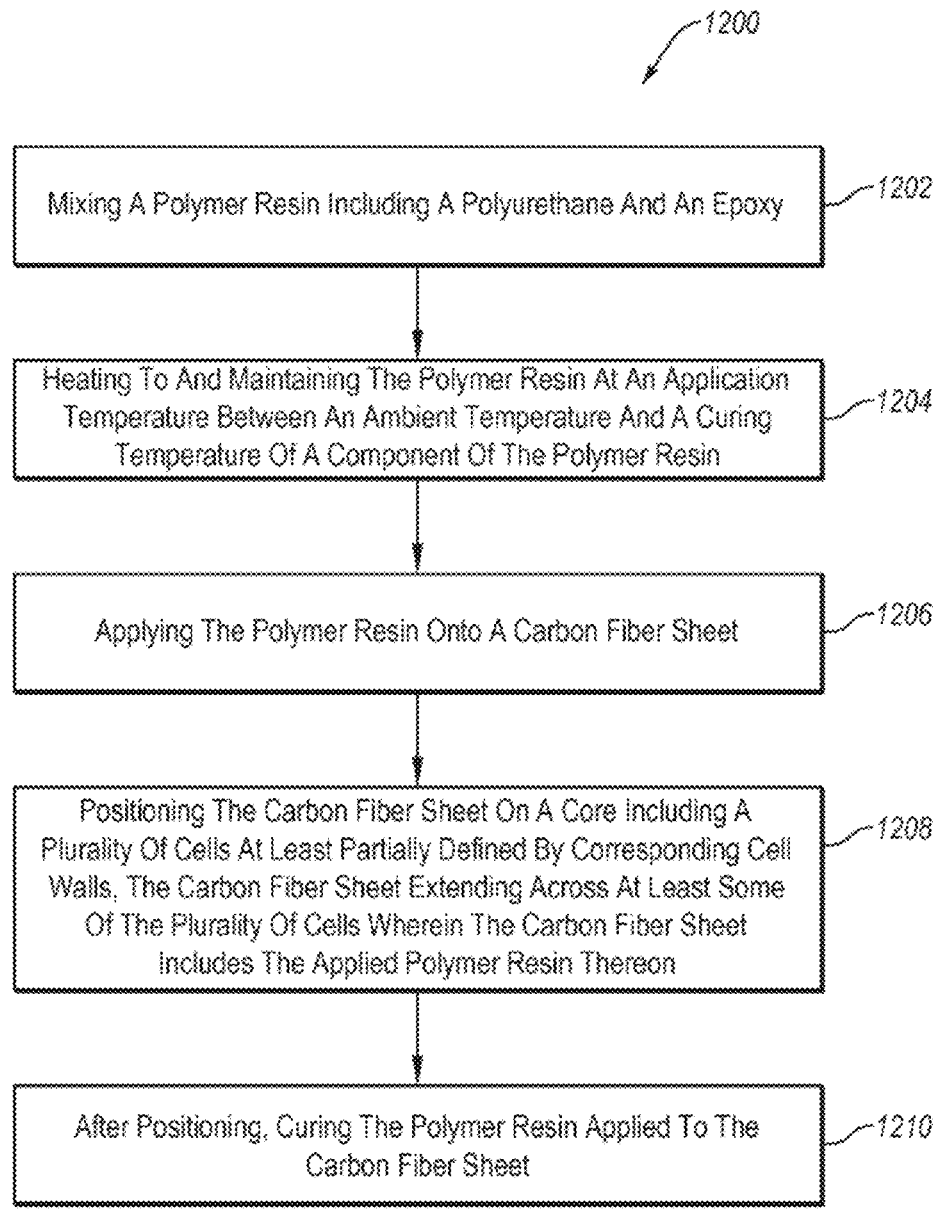
FIG. 12 is a flow chart for a method of forming a composite sandwich according to an embodiment.

FIG. 12 is a flow chart of a method for forming a composite laminate structure in accordance with embodiments of the present disclosure. Method 1200 may include mixing a polymer resin in an act 1202. The polymer resin may include any polymer resin disclosed herein. For example, the polymer resin may include a polyurethane and an epoxy, with the epoxy having a higher load transfer capability than the polyurethane. In an embodiment, the polymer resin may include one or more of an epoxy, a polyurethane, a thermoplastic, a hardener, a filler material, or a Group VIII metal material according to any of the embodiments disclosed herein.

Mixing the polymer resin may include mixing the polymer resin in situ or prior to applying the polymer resin. For example, mixing the polymer resin in situ may include mixing the polymer resin by applying a first component (e.g., polyurethane) of a polymer resin to a precursor component of a composite laminate structure such as a fiber sheet in a stack, applying at least a second component (e.g., one or more of an epoxy, hardener, filler, Group VIII metal, and/or thermoplastic) of the polymer resin to the same precursor component or a different precursor component (e.g., a second fiber sheet in the stack) of the composite laminate structure, and causing the first component and at least a second component to contact one another. In an embodiment, causing the first component and at least a second component to contact one another may include pressing adjacent fiber sheets having the first component and at least one second component such that the first and at least a second components of the polymer resin contact one another. In an embodiment, applying a first component (e.g., polyurethane) of a polymer resin and applying at least a second component (e.g., epoxy and/or thermoplastic) of the polymer resin to the same component or a different component of the composite laminate structure, and causing the first component and at least a second component to contact one another may include applying the first component and the at least a second component in direct contact with each other such as in directly adjacent layers (e.g., contacting carbon fiber sheets). Such application may be manually spreading or spraying. For example, the first component may be applied to the carbon fiber sheet on a side adjacent to the core blank and the second component may be applied to an opposing side of the fiber sheet.

Mixing the polymer resin prior to application may include those methods disclosed herein (e.g., mixing in the bag, a pressure pot, container, or commercial spray system). The resultant structure may include a layered or pseudo-layered polymer resin mixture having a layer of the first component of the polymer resin, a layer of the at least one second component of the polymer resin, and an interposing layer of a mixture of the first and at least a second component of the polymer resin. For example, each layer may be about one third of the height of the polymer resin containing layers in the resulting cured part. In an embodiment, each single polymer component layer may be less than about 40% of the cross-sectional thickness of the portion(s) of the composite laminate structure including the polymer resins therein. In some embodiments, the first and at least a second component of the polymer resin may substantially completely mix, such that the composite laminate structure made by such acts exhibits a substantially homogenous cured polymer resin therethrough. The method 1200 may include an act 1204 of heating to and maintaining the polymer resin at an application temperature. The application temperature may include a temperature configured to provide a selected viscosity to the polymer resin, such as a temperature selected to provide a viscosity to the polymer resin suitable for low pressure spraying. In an embodiment, the application temperature may between an ambient temperature and a curing temperature of a component (e.g., one or more of an epoxy, hardener, or polymer) of the polymer resin. In the case of polymer resins including thermoplastics, the application temperature may be above the melting temperature of the thermoplastic. In some embodiments, the application temperature may be less than about 100° C., such as less than about 90° C., about 40° C. to about 85° C., about 50° C. to about 70° C., about 50° C., about 80° C., about 75° C. to about 85° C., or about 65° C.

The method 1200 may include an act 1206 of applying the polymer resin onto a fiber sheet (e.g., carbon fiber sheet) or the core. Applying the polymer resin to the fiber sheet or the core may include spraying the polymer resin at a pressure of less than 90 psi onto a fiber sheet and/or a mold. In an embodiment, spraying the polymer resin at a pressure of less than about 90 psi may include spraying the polymer resin at a pressure of less than about 70 psi. In an embodiment applying the polymer resin may include manually spreading the polymer resin onto one or more of the fiber sheet, the core, or any other component of a composite laminate structure. Manually applying the polymer resin may include manually spreading the polymer resin using a tool such as a trowel, brush, or spatula. In an embodiment, manually applying the polymer resin may include manually spreading the polymer resin by rolling the polymer resin onto at least one fiber sheet or core with a roller carrying the polymer resin thereon, such as an at least partially polymer resin saturated roller.

In an embodiment, applying (e.g., spraying) the polymer resin may include applying more than one layer, or more than one polymer resin onto a fiber sheet or multiple fiber sheets (e.g., separate fiber sheets). For example, applying a polymer resin onto a fiber sheet may include applying a first polymer resin onto a first carbon fiber sheet, and applying a second polymer resin onto a second carbon fiber sheet.

The method 1200 may include the act 1208 of positioning the carbon fiber sheet on a plurality of cells, the carbon fiber sheet extending across the open ends of the cells. The cells may be similar or identical to any cells (e.g., tubes) disclosed herein, such as being at least partially defined by a plurality of polycarbonate tubes. Positioning the carbon fiber sheet may include positioning more than one carbon fiber sheet, such, two carbon fiber sheets on opposite sides of the core. In an embodiment, positioning the carbon fiber sheet may include positioning the carbon fiber sheet in a mold and positioning a core adjacent thereto (e.g., on top of or below the carbon fiber sheet).

The method 1200 may include the act 1210 of curing the polymer resin applied on the carbon fiber sheet, such as for less than about 10 minutes. In some embodiments, curing the polymer resin may be carried out after positioning according to act 1208. In an embodiment, curing the polymer resin may include heating the polymer resin, composite laminate, or composite sandwich, such as in a mold, kiln, or oven. Heating the polymer resin may be carried out to about 110° C. or more, such as about 120° C. to about 200° C., about 130° C. to about 180° C., about 140° C. to about 160° C., about 120° C., about 130° C., about 140° C., or about 160° C. In some embodiments, heating the polymer resin may be carried out for any suitable curing time disclosed herein.

In some embodiments, the method 1200 may include positioning the carbon fiber sheet on a core prior to curing; the core including any material or configuration for a core disclosed herein, such as a plurality of closely-packed polycarbonate tubes. In some embodiments, the method 1200 may include disposing one or more of the carbon fiber sheets, polymer resin or components thereof, or core in a mold and applying pressure to at least partially close the mold to form a composite laminate structure having the shape of the mold and/or at least partially collapse the core. In an embodiment, heat may be simultaneously applied to at least partially heat one or more of the polymer resin, the carbon fiber sheets, or the core. For example, the core may become more pliable upon application of heat during pressing, such that the core at least partially softens or melts, while compressing to increase compliance with the shape of the mold. The polymer resin may at least begin curing upon application of heat in the mold.

Figure 13:
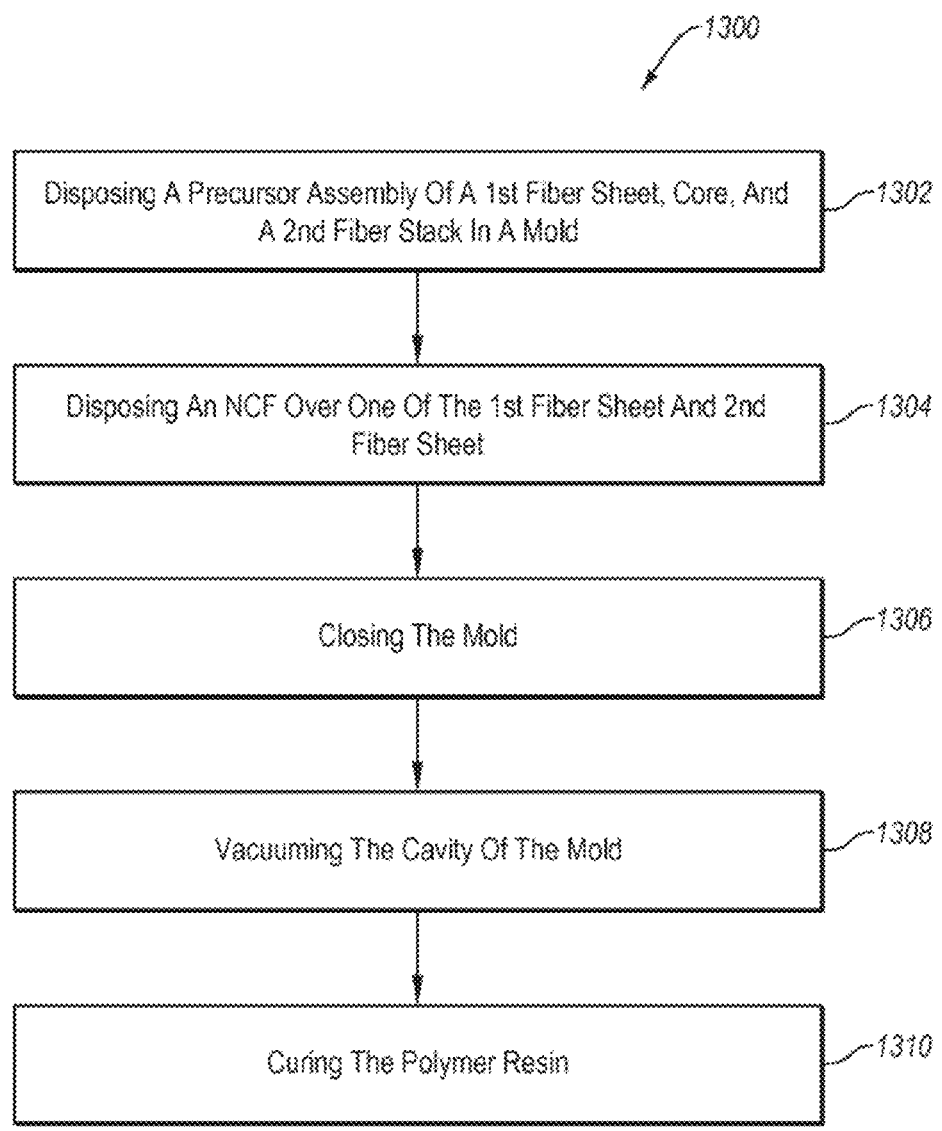
FIG. 13 is a flow chart for a method of forming a composite sandwich according to an embodiment.

FIG. 13 is a flow chart of a method for forming a composite laminate structure in accordance with embodiments of the present disclosure. Method 1300 may include disposing a stack (e.g., composite laminate precursor assembly) of a first fiber sheet, a core, and a second fiber sheet in a mold, in act 1302. For example, each fiber sheet may include one, two, or more individual fiber sheets bound together. In an embodiment, disposing a first fiber sheet, a core, and a second fiber sheet in a mold may include impregnating one or more of the fiber sheets with a polymer resin. In an embodiment, each of the first and second fiber sheets may be impregnated with a polymer resin or component thereof by spraying and/or manually spreading the polymer resin on each fiber sheet prior or after to being disposed in the mold. The polymer resin may include any polymer resin disclosed herein. In an embodiment, different composite laminates (e.g., different layers of fibers sheets) may include the same or different polymer resins than adjacent composite laminates. For example, in an embodiment, the composite laminates adjacent to the mold cavity may include a polymer resin having a higher amount of epoxy (or only epoxy) therein to impart a water tight characteristic to the resulting composite sandwich. In an embodiment, one or more composite laminates may include a polymer resin having a fire retardant (e.g., phenolic epoxy). In an embodiment, one or more composite laminates proximate to the core may include a polymer resin having a higher amount of polyurethane (or only polyurethane) therein to provide a desired amount of bonding between the polymer resin and the core.

In an embodiment, the method 1300 may include applying a polymer resin onto at least one carbon fiber sheet such as by spraying or manually spreading. In an embodiment, spraying the polymer resin may be carried out at a pressure of less than about 90 psi onto at least one fiber sheet. In an embodiment, applying (e.g., spraying or manually spreading) a polymer resin onto a at least one fiber sheet may include spraying a polymer resin onto a first carbon fiber sheet and one or more an additional carbon fiber sheets. In an embodiment, the method may include positioning one or more carbon fiber sheets on the core, such as on the same side (e.g., a layered configuration) and/or on opposite sides thereof. For example, the method may include applying a polymer resin onto a first carbon fiber sheet and a second carbon fiber sheet such as to at least partially impregnate the fiber sheets with the polymer resin. The method may further include positioning the first carbon fiber sheet on a first side of the core adjacent to the open ends of the core and the second carbon fiber sheet on the second side of the core opposite the first side. Such positioning may be carried out before or after the carbon fiber sheets have be at least partially impregnated with the polymer resin. In an embodiment, the second carbon fiber sheet may be positioned on top of the first carbon fiber sheet. In an embodiment, the first carbon fiber sheet and/or the second carbon fiber sheet may include randomly oriented discontinuous fibers, continuous fibers, or a carbon fiber NCF.

The method of preparing and applying (e.g., spraying) the resin may be similar or identical to the methods of preparing and spraying polymer resins disclosed above. The polymer resin, polymer preparation, and/or application (e.g., spraying) method may significantly reduce pressure required to flow the polymer resin into the mold and impregnate the fibers, such as in resin transfer mold. In some embodiments, the core may be a "hard" core, for example, including a plurality of tubes bonded to each other and having a first open end and a second open end, such as polycarbonate tubes. The mold cavity may be formed from a lower mold portion and an upper mold portion. In some embodiments, the core may be a "soft" core.

Method 1300 may also include disposing a NCF or a woven fabric over one of the first fiber sheet and second fiber sheet in the mold at act 1304. The NCF may strengthen the composite. The NCF may also reduce print-through from the composite core. The NCF may further improve laminate surface quality and enhance aesthetics.

Method 1300 may further include closing the mold at act 1306. Closing the mold may include applying an external pressure to the mold, such as to compress one or more components therein. Method 1300 may also optionally include vacuuming the cavity of the mold at act 1308. For example, it may be desired to vacuum the mold to remove the trapped air in the randomly oriented discontinuous fibers when the composite laminate is formed of discontinuous fibers. In contrast, the continuous fibers may not trap air as much as the discontinuous fibers such that vacuuming the mold may not be necessary when the composite laminate is formed of continuous fibers. Method 1300 may also include curing the polymer resin to form a composite component at act 1310. Curing the polymer resin may include heating the fiber sheet having the polymer resin therein or thereon (e.g., an at least partially formed composite laminate or a precursor thereof such as a stack) containing the polymer resin in the mold or outside of the mold to about 110° C. or more, such as about 120° C. to about 200° C., about 130° C. to about 180° C., about 140° C. to about 160° C., about 120° C., about 130° C., about 140° C., or about 160° C. Curing the polymer resin may take place over a duration of about 40 seconds or more, such as about 40 seconds to about 1 day, about 1 minute to about 12 hours, about 90 seconds to about 8 hours, about 2 minutes to about 4 hours, about 40 seconds to about 10 minutes, about 1 minute to about 8 minutes, about 90 seconds to about 5 minutes, about 3 minutes, about 6 minutes or less, or about 8 minutes or less. In an embodiment, heating/curing the polymer resin may be partially carried out in the mold and then may be completed in a different location (e.g., an oven or kiln). The resulting cured composite component may have any shape determined by the mold.

In some embodiments, a composite sandwich may include one or more cores, such as having more than one core separated by one or more composite laminate layers. For example, a composite sandwich may include a "hard" core of bonded circular plastic tubes and a composite laminate layer on either side thereof. The composite sandwich may include an additional "soft" core of paper board adjacent to a composite laminate layer on the first "hard" core. The soft core may include at least one more composite laminate layers on the side opposite the hard core. In such embodiments, a desired toughness (e.g., resiliency and/or hardness) and sound dampening may be achieved. In some embodiments, a composite sandwich may include one or more composite laminate layers having one or more fiber sheets including one or more differing or identical polymer resins therein, respectively. For example, in an embodiment, a composite sandwich may include a core having a carbon fiber sheet thereon, the carbon fiber sheet may include a polyurethane polymer resin therein, and the carbon fiber sheet may be adjacent to another carbon fiber sheet having an epoxy therein. In such embodiments, the polyurethane may be applied to the stack in the mold separately from the epoxy in an adjacent layer. The resulting composite laminate structure may exhibit the desired energy absorption, breakage profiles, water resistance, and/or sound absorption.

In an embodiment disposing a stack of a first fiber sheet, a core, and a second fiber sheet in a mold, and spraying the polymer resin at a pressure of less than about 90 psi may include spraying a powdered filler material into a mold, placing a first fiber sheet thereon, spraying a first polymer resin (e.g., an epoxy) on the first carbon fiber sheet, placing a second carbon fiber sheet on the first carbon fiber sheet, spraying a second polymer resin (e.g., polyurethane) on the second carbon fiber sheet, and placing a core in contact with the second carbon fiber sheet. The stack may have the layered composition of a first polymer resin on first carbon fiber sheet, on a second polymer resin on a second carbon fiber sheet, on a core. The same or a different configuration may be disposed on the opposite side of the core. The polymer resins, carbon fiber sheets, and/or core may be similar or identical to any polymer resin, carbon fiber sheet, or core disclosed herein. In some embodiments, a filler material may be disposed on the mold prior to disposing any portions of the composite laminate therein. For example a thin layer of filler material may be sprayed on the mold prior to placing the carbon fiber sheets therein. The filler material may be incorporated into the polymer resin subsequently sprayed therein (at the surface thereof) and serve to reduce shrinkage at least at the surface of the composite laminate formed therein without compromising the bulk mechanical properties of the composite laminate.

The composite sandwiches disclosed herein may have good sound absorption, good heat insulation, high bending stiffness, high energy absorption, and light weight. The composite sandwiches may be used in various applications including auto industry (e.g., chassis, car hood, car body parts and the like), other vehicles (e.g., trucks), agricultural equipment, bicycles, satellite applications, aerospace applications, construction materials (e.g., building materials and the like), consumer products (e.g., furniture, toilet seats, and electronic products among others).

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:

1. A composite laminate structure, comprising:
   at least one core including a plurality of cells, each of the plurality of cells at least partially defined by corresponding cell walls, the core having a first end and a second end;
   one or more first composite laminates attached to the first end of the core; and
   one or more second composite laminates attached to the second end of the core;
   each of the one or more first composite laminates and the one or more second composite laminates having a plurality of fibers and a cured polymer resin disposed within the plurality of fibers, the cured polymer resin including a polyurethane and an epoxy, wherein the epoxy is about 10% to about 40% of the polymer resin by volume.

2. The composite laminate structure of claim 1, wherein the cured polymer resin exhibits a shrinkage of less than about 3% from an uncured state.

3. The composite laminate structure of claim 2, wherein the polymer resin in one or more of the composite laminates includes a filler material therein, the filler material including particles of one or more of calcium carbonate, a silica, or an alumina.

4. The composite laminate structure of claim 1, wherein the at least one core includes a hard core and a soft core, the hard core includes a plurality of plastic tubes bound together in parallel, and the soft core includes one or more of paper board or cardboard between the one or more first composite laminates and the one or more second composite laminates.

5. The composite laminate structure of claim 1, wherein the plurality of fibers in at least one of the one or more first composite laminates or the one or more second composite laminates includes discontinuous fibers or continuous fibers embedded in the cured polymer resin.

6. The composite laminate structure of claim 1, wherein the plurality of fibers include one or more of carbon fibers, glass fibers, or plastic fibers.

7. The composite laminate structure of claim 1, wherein an outermost layer of the one or more first composite laminates or the one or more second composite laminates includes a non-crimp fabric or woven fabric the non-crimp fabric or woven fabric including cured polymer resin therein.

8. The composite laminate structure of claim 1, wherein the epoxy is about 25% to about 35% of the polymer resin by volume.

9. The composite laminate structure of claim 1, wherein the polymer resin includes a hardener in addition to the epoxy and the polyurethane and the hardener is present in a ratio of about 1:100-1:3 by volume of the polymer resin.

10. The composite laminate structure of claim 1, wherein the polymer resin includes a thermoplastic polymer and the thermoplastic is about 1% to about 20% of the polymer resin by volume, wherein the thermoplastic includes one or more of a polypropylene, a polycarbonate, polyethylene, polyphenylene sulfide, polyether ether ketone (PEEK), a polyaryletherketone, or an acrylic resin.

11. The composite laminate structure of claim 10, wherein the thermoplastic includes one or more of polyether ether ketone, polycarbonate, polyether, or polypropylene.

12. The composite laminate structure of claim 1, wherein the polymer resin includes filler material particles and the filler material particles are about 1% to about 30% of the polymer resin by volume.

13. The composite laminate structure of claim 1, wherein polymer resin includes a Group VIII metal material and the Group VIII metal material is about 5% of the polymer resin by volume or less.

14. The composite laminate structure of claim 1, wherein at least a portion of the polymer resin produces a foam prior to or during curing and at least a portion of the foam extends into one or more of the plurality of cells.

15. A composite laminate structure, comprising:
   at least one core including a plurality of cells at least partially defined by corresponding cell walls, the core having a first end and a second end;
   one or more first composite laminates attached to the first end of the core;
   one or more second composite laminates attached to the second end of the core, wherein each of the one or more first and the one or more second composite laminates include a cured polymer resin therein, the cured polymer resin including a polyurethane and an epoxy, and wherein the epoxy is about 10% to about 40% of the polymer resin by volume; and
   a foam of the cured polymer resin in the one or more first composite laminates and the one or more second composite laminates extending into one or more of the plurality of cells.

16. The composite laminate structure of claim 15, wherein at least one of the one or more first composite laminates and the one or more second composite laminates includes discontinuous fibers or continuous fibers embedded in the cured polymer resin.

17. The composite laminate structure of claim 16, wherein the discontinuous fibers or continuous fibers include one or more of carbon fibers, glass fibers, or plastic fibers.

* * * * *